(12) United States Patent
You et al.

(10) Patent No.: US 9,425,935 B2
(45) Date of Patent: Aug. 23, 2016

(54) METHOD AND USER EQUIPMENT FOR PERFORMING RADIO RESOURCE MANAGEMENT, AND METHOD AND BASE STATION FOR REQUESTING RADIO RESOURCE MANAGEMENT

(71) Applicant: LG ELECTRONICS INC., Seoul (KR)

(72) Inventors: Hyangsun You, Anyang-si (KR); Yunjung Yi, Anyang-si (KR); Joonkui Ahn, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/411,280

(22) PCT Filed: Jun. 26, 2013

(86) PCT No.: PCT/KR2013/005641
§ 371 (c)(1),
(2) Date: Dec. 24, 2014

(87) PCT Pub. No.: WO2014/003432
PCT Pub. Date: Jan. 3, 2014

(65) Prior Publication Data
US 2015/0139113 A1 May 21, 2015

Related U.S. Application Data

(60) Provisional application No. 61/664,162, filed on Jun. 26, 2012.

(51) Int. Cl.
*H04L 5/00* (2006.01)
*H04W 72/04* (2009.01)

(52) U.S. Cl.
CPC ............. *H04L 5/0048* (2013.01); *H04L 5/003* (2013.01); *H04L 5/0053* (2013.01); *H04W 72/042* (2013.01)

(58) Field of Classification Search
CPC ... H04L 5/0048; H04L 5/003; H04L 5/0053; H04W 72/042
See application file for complete search history.

(56) References Cited

U.S. PATENT DOCUMENTS

| | | | |
|---|---|---|---|
| 2003/0171123 A1 | 9/2003 | Laakso et al. | |
| 2010/0080180 A1 | 4/2010 | Tortora | |
| 2010/0331028 A1 | 12/2010 | Cordeiro et al. | |
| 2011/0092231 A1* | 4/2011 | Yoo | H04B 1/7097 455/501 |
| 2012/0039298 A1 | 2/2012 | Lee et al. | |
| 2012/0083280 A1* | 4/2012 | Liu | H04W 16/14 455/446 |
| 2013/0114535 A1* | 5/2013 | Ng | H04W 72/0446 370/329 |
| 2013/0188592 A1 | 7/2013 | Yang et al. | |
| 2013/0279376 A1* | 10/2013 | Ahmadi | H04W 16/14 370/277 |
| 2014/0254504 A1* | 9/2014 | Bashar | H04L 5/0048 370/329 |

FOREIGN PATENT DOCUMENTS

| | | | |
|---|---|---|---|
| KR | 10-2010-0116550 A | 11/2010 | |
| KR | 10-2012-0016288 A | 2/2012 | |
| WO | WO 2012/044135 A2 | 4/2012 | |

* cited by examiner

*Primary Examiner* — Ajay Cattungal
(74) *Attorney, Agent, or Firm* — Birch, Stewart, Kolasch & Birch, LLP

(57) ABSTRACT

The present invention provides a method and user equipment for performing radio resource management. The user equipment receives a request for radio resource management for a cell, and performs radio resource management for the cell based on said request for radio resource management. The request for radio resource management includes information indicating the type of reference signal to be used in the radio resource management.

11 Claims, 13 Drawing Sheets

(a)

FIG. 12
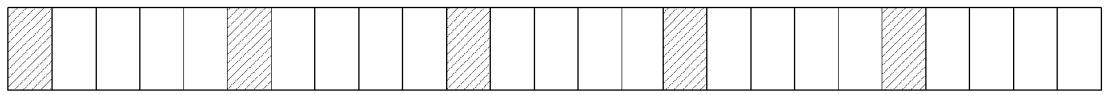
(a)
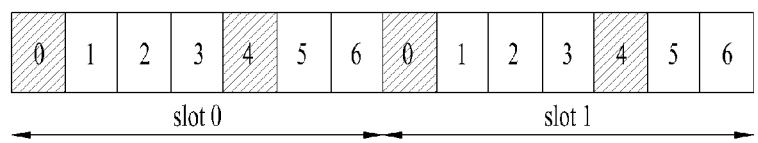
(b)
FIG. 13
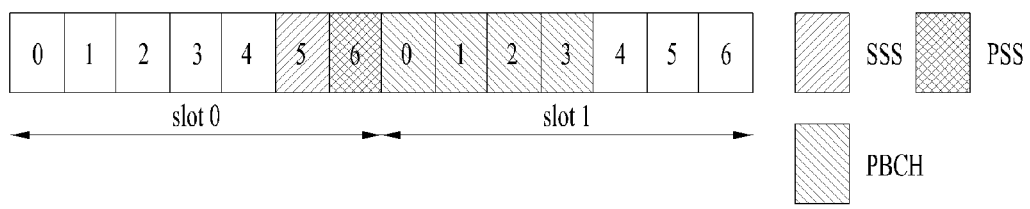
FIG. 14
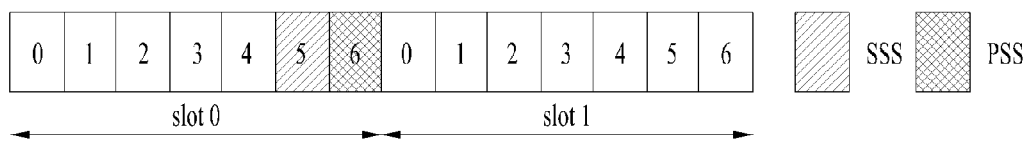
(a) LCT
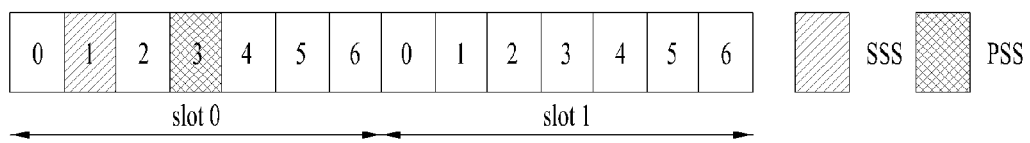
(b) NCT

FIG. 15
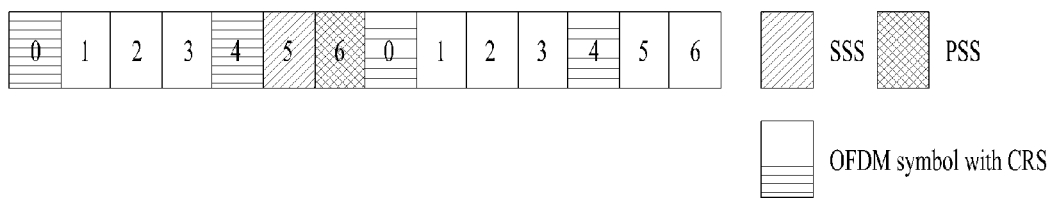
FIG. 16
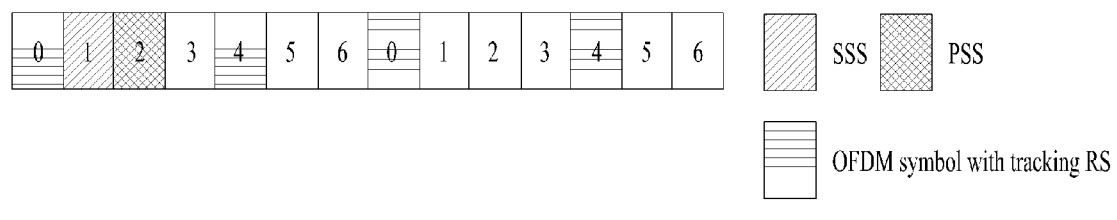
(a)
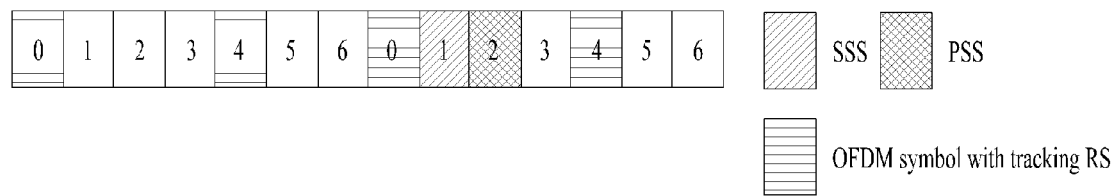
(b)

METHOD AND USER EQUIPMENT FOR PERFORMING RADIO RESOURCE MANAGEMENT, AND METHOD AND BASE STATION FOR REQUESTING RADIO RESOURCE MANAGEMENT

CROSS REFERENCE TO RELATED APPLICATIONS

This application is a National Phase of International Application No. PCT/KR2013/005641, filed on Jun. 26, 2013, which claims the benefit under 35 U.S.C. §119(e) to U.S. Provisional Application No. 61/664,162, filed on Jun. 26, 2012, all of which are hereby expressly incorporated by reference into the present application.

TECHNICAL FIELD

The present invention relates to a wireless communication system and, more particularly, to a method and apparatus for performing radio resource management.

BACKGROUND ART

In a wireless communication system, a user equipment (UE) may receive data and/or a variety of control information from a base station (BS) on downlink (DL) and transmit data and/or a variety of control information on uplink (UL). To communicate with the BS, the UE needs to establish synchronization with the BS. To this end, the UE, which is powered on again from a power-off state or newly enters a cell which is a geographic region served by a BS, performs initial cell search accompanying operation such as synchronization establishment with the BS. Upon completion of initial cell search, the UE may receive data and/or control information through a physical DL channel and transmit data and/or control information through a physical UL channel.

For various reasons including cell search, maintenance of time synchronization after synchronization between the UE and the BS, and compensation of a frequency offset, a wireless communication system which has been discussed until the present defines transmission/reception of various mandatory signals on designated radio resources.

The types and number of these mandatory signals have increased with the advance of standards of the wireless communication system. Since signals other than the mandatory signals cannot be allocated to radio resources to which the mandatory signals are allocated, the mandatory signals which are increasing in accordance with advances in the wireless communication system hinder the degree of freedom of scheduling of the wireless communication system and also restrict introduction of more efficient communication technology for the wireless communication system.

DETAILED DESCRIPTION OF THE INVENTION

Technical Problems

Recently, configuration of new carriers which are free from restrictions of mandatory signals defined up to now has been considered. A method and/or apparatus for configuring or recognizing the new carriers while maintaining compatibility with an apparatus configured according to a legacy system is needed.

In addition, a method and/or apparatus for measuring a new radio resource by removing restrictions of the legacy system is needed.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for performing radio resource management by a user equipment, comprising receiving a radio resource management request for a cell; and performing radio resource management for the cell based on the radio resource management request, wherein the radio resource management request includes information indicating a type of a reference signal used for the radio resource management.

In another aspect of the present invention, provided herein is a user equipment for performing radio resource management, comprising a radio frequency (RF) unit and a processor configured to control the RF unit, wherein the RF unit configured to receive a radio resource management request for a cell; the processor is configured to perform radio resource management for the cell based on the radio resource management request, and the radio resource management request includes information indicating a type of a reference signal used for the radio resource management.

In still another aspect of the present invention, provided herein is a method for requesting radio resource management by a base station, comprising transmitting a radio resource management request for a cell, and wherein the radio resource management request includes information indicating a type of a reference signal used for radio resource management for the cell.

In a further aspect of the present invention, provided herein is a base station for requesting radio resource management, comprising a radio frequency (RF) unit and a processor configured to control the RF unit, wherein the processor is configured to control the RF unit to transmit a radio resource management request for a cell, and the radio resource management request includes information indicating a type of a reference signal used for radio resource management for the cell.

In each aspect of the present invention, the information indicating the type of the reference signal may indicate whether the reference signal used for the radio resource management is a tracking reference signal.

In each aspect of the present invention, the radio resource management request may further include information indicating a bandwidth for the tracking reference signal of the cell.

In each aspect of the present invention, the information indicating the type of the reference signal may indicate whether the reference signal used for the radio resource management is a channel state information reference signal.

In each aspect of the present invention, the radio resource management request may further include channel state information reference signal configuration information of the cell.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, new carriers which are free from restrictions of mandatory signals of a legacy system while maintaining compatibility with the legacy system can be configured.

In addition, measurement for radio resource management of new carriers can be more accurately performed.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 12 illustrates a TRS on a carrier according to the present invention.

FIG. 13 illustrates a synchronization signal and a broadcast signal on an LCT CC.

FIG. 14 illustrates an embodiment of the present invention for distinguishing between LCT and NCT.

FIGS. 15 and 16 illustrate another embodiment for distinguishing between LCT and NCT.

MODE FOR INVENTION

Figure 1:
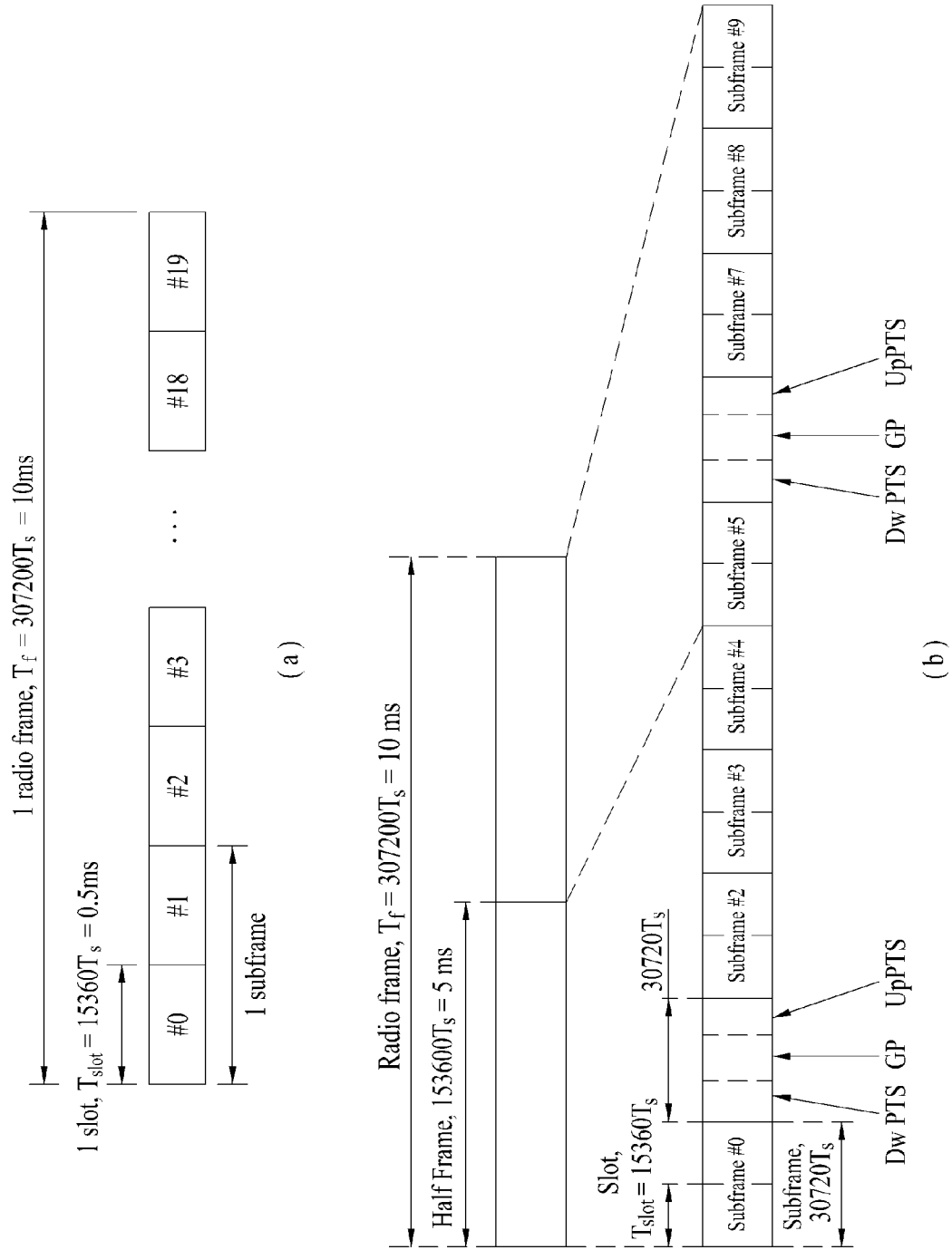
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

Hereinafter, a detailed description of embodiments of the present invention will be given by referring to a carrier configured according to a legacy radio communication standard as a legacy carrier type (LCT) carrier, an LCT component carrier (CC), an LCT cell, or a normal carrier and by referring to a carrier configured according to less restrictions relative to the LCT carrier as a new carrier type (NCT) carrier, an NCT CC, an NCT cell, or an extended carrier.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. Hereinafter, a "cell" of a radio resource will be described in more detail with reference to FIGS. 10 and 11.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS ports may also be used to indicate a pattern of REs occupied by CRSs/UE-RSs/CSI-RSs in a predetermined resource region FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 1-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
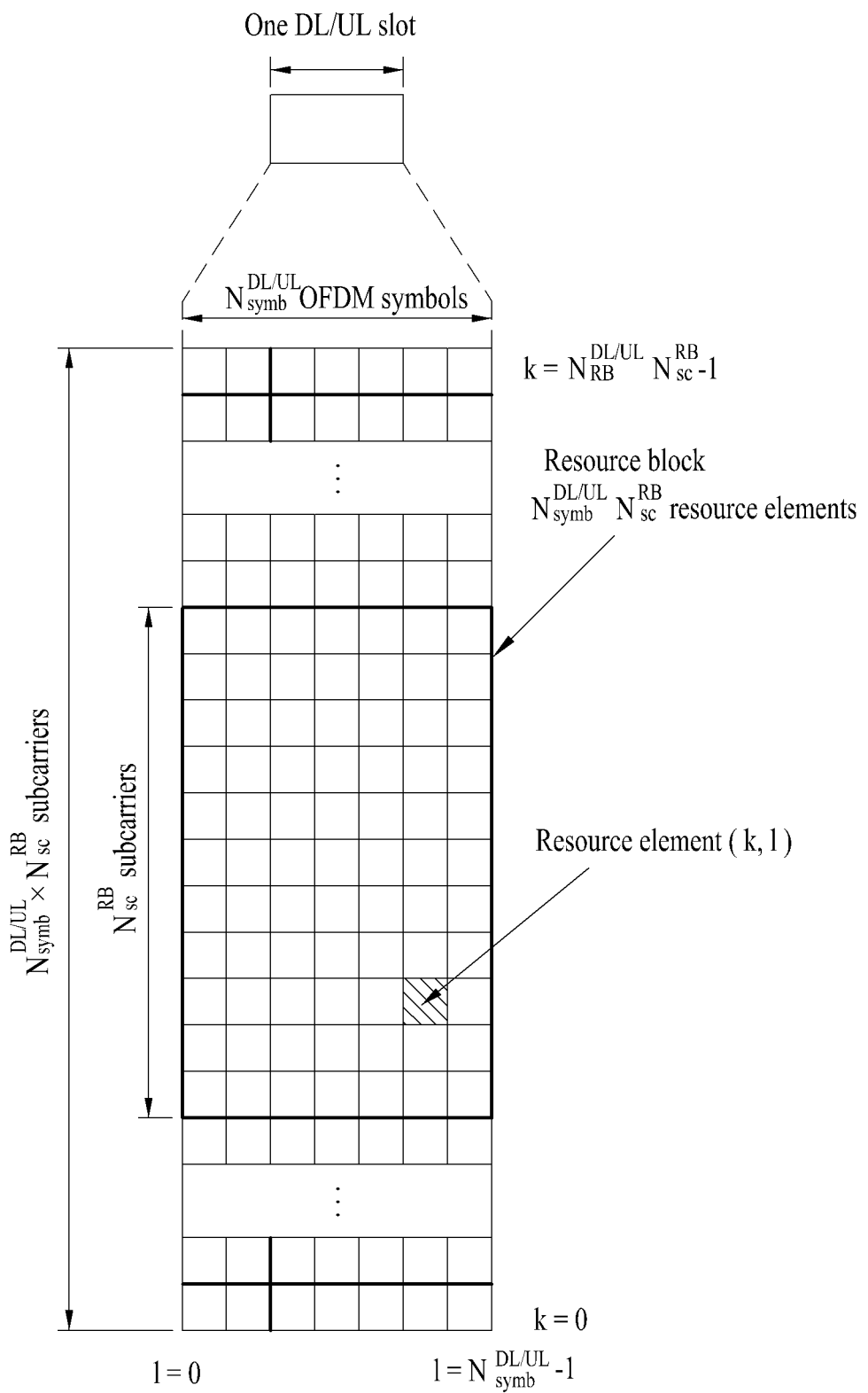
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{DL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/DL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}1-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
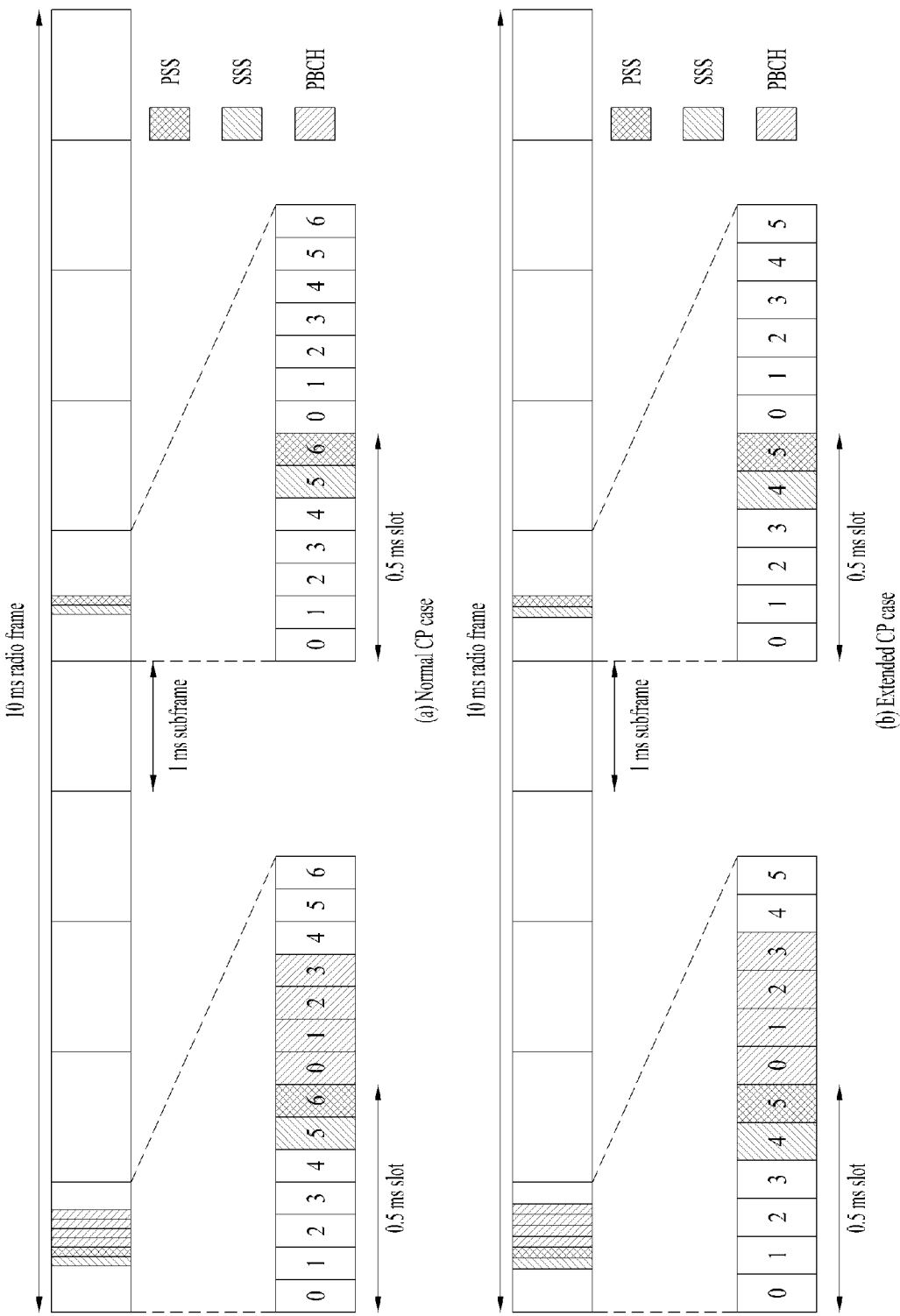
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(*a*) illustrates transmission locations of an SS and a PBCH in a radio frame configured as a normal cyclic prefix (CP) and FIG. 3(*b*) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}$ (=3$N^{(1)}_{ID}$ $N^{(2)}_{ID}$) is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi u n(n+1)}{N_{ZC}}}$$ [Equation 1]

where $N_{ZC}$=63 and a sequence element corresponding to a DC subcarrier, n=31, is punctured.

The PSS is mapped to 6 RBs (=72 subcarriers) near to a center frequency. Among the 72 subcarriers, 9 remaining subcarriers carry a value of always 0 and serve as elements facilitating filter design for performing synchronization. To define a total of three PSSs, u=24, 29, and 34 are used in Equation 1. Since u=24 and u=34 have a conjugate symmetry relationship, two correlations may be simultaneously performed. Here, conjugate symmetry indicates the relationship of the following Equation.

$d_u(n)=(-1)^n(d_{N_{ZC}-u}(n))^*$, when $N_{ZC}$ is even number $d_u(n)=(d_{N_{ZC}-u}(n))^*$, when $N_{ZC}$ is odd number [Equation 2]

A one-shot correlator for u=29 and u=34 may be implemented using the characteristics of conjugate symmetry. The entire amount of calculation can be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases}$$ [Equation 3]

In Equation 3, the Zadoff-Chu root sequence index u is given by the following table.

TABLE 3

| $N^{(2)}_{ID}$ | Root index u |
| --- | --- |
| 0 | 25 |
| 1 | 29 |
| 2 | 34 |

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Figure 4:
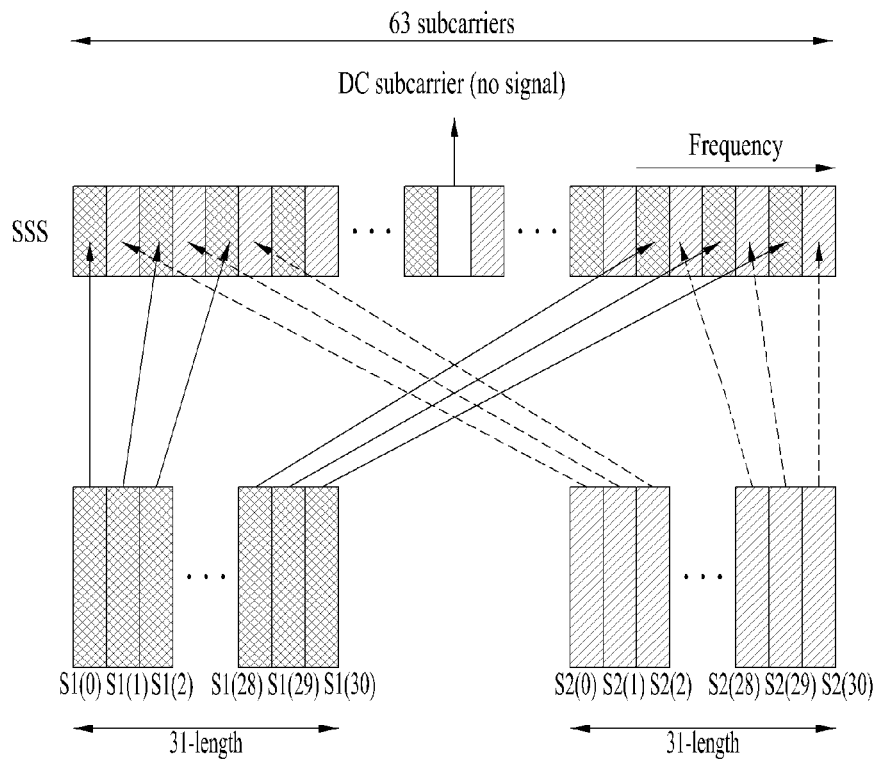
FIG. 4 illustrates a secondary synchronization signal (SSS) generation scheme.

FIG. 4 illustrates an SSS generation scheme. Specifically, FIG. 4 illustrates a relationship of mapping of two sequences in the logical domain to sequences in a physical domain.

A sequence used for the SSS is an interleaved concatenation of two length-31 m-sequences of and the concatenated sequence is scrambled by a scrambling sequence given by a PSS. Here, an m-sequence is a type of a pseudo noise (PN) sequence.

Referring to FIG. 4, if two m-sequences used for generating an SSS code are S1 and S2, then two different PSS-based sequences S1 and S2 are scrambled into to the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5+x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms can be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5 and a total of 168 cell group IDs are expressed by a combination of the two length-31 m-sequences. The m-sequences used as sequences of the SSS have a robust property in a frequency selective environment. In addition, since the m-sequences can be transformed by high-speed m-sequence transform using fast Hadamard transform, if the m-sequences are used as the SSS, the amount of calculation necessary for a UE to interpret the SSS can be reduced. Since the SSS is configured by two short codes, the amount of calculation of the UE can be reduced.

Generation of the SSS will now be described in more detail. A sequence $d(0), \ldots, d(61)$ used for the SSS is an interleaved concatenation of two length-31 binary sequences. The concatenated sequence is scrambled by a sequence given by the PSS.

A combination of two length-31 sequences for defining the PSS becomes different in subframe 0 and subframe 5 according to the following.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 4]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, $0 \le n \le 30$. The indices $m_0$ and $m_1$ are derived from the physical-layer cell-identity group $N^{(1)}_{ID}$ according to the following.

$$m_0 = m' \bmod 31 \quad \text{[Equation 5]}$$
$$m_1 = (m_0 + \lfloor m'/31 \rfloor + 1) \bmod 31$$
$$m' = N^{(1)}_{ID} + q(q+1)/2,$$
$$q = \left\lfloor \frac{N^{(1)}_{ID} + q'(q'+1)/2}{30} \right\rfloor,$$
$$q' = \lfloor N^{(1)}_{ID}/30 \rfloor$$

The output of Equation 5 is listed in Table 4 following Equation 11.

The two sequences $s^{(m0)}_0(n)$ and $s^{(m1)}_1(n)$ are defined as two different cyclic shifts of the m-sequence $s(n)$.

$$s_0^{(m0)}(n) = s((n+m_0) \bmod 31)$$
$$s_1^{(m1)}(n) = s((n+m_1) \bmod 31) \quad \text{[Equation 6]}$$

In Equation 6, $s(i)=1-2x(i)$, $0 \le i \le 30$, is defined by the following equation with initial conditions $x(0)=0$, $x(1)=0$, $x(2), x(3)=0, x(4)=1$.

$$x(\bar{i}+5)=(x(\bar{i}+3)+x(\bar{i})) \bmod 2,\ 0 \le \bar{i} \le 25 \quad \text{[Equation 7]}$$

The two scrambling sequences $c_0(n)$ and $c_1(n)$ depend on the PSS and are defined by two different cyclic shifts of the m-sequence $c(n)$ according to the following equation.

$$c_0(n) = c((n+N^{(2)}_{ID}) \bmod 31)$$
$$c_1(n) = c((n+N^{(2)}_{ID}+3) \bmod 31) \quad \text{[Equation 8]}$$

In Equation 8, $N^{(2)}_{ID} \in \{0,1,2\}$ is the physical-layer identity within the physical-layer cell identity group $N^{(1)}_{ID}$ and $c(i)=1-2x(i)$ $(0 \le i \le 30)$, is defined by the following equation with initial conditions $x(0)=0$, $x(1)=0$, $x(2), x(3)=0, x(4)=1$.

$$x(\bar{i}+5)=(x(\bar{i}+3)+x(\bar{i})) \bmod 2,\ 0 \le \bar{i} \le 25 \quad \text{[Equation 9]}$$

The scrambling sequences $z^{(m0)}_1(n)$ and $z^{(m1)}_1(n)$ are defined by a cyclic shift of the m-sequence $z(n)$ according to the following equation.

$$z_1^{(m0)}(n) = z((n+(m_0 \bmod 8)) \bmod 31)$$
$$z_1^{(m1)}(n) = z((n+(m_1 \bmod 8)) \bmod 31) \quad \text{[Equation 10]}$$

In Equation 10, $m_0$ and $m_1$ are obtained from Table 4 following Equation 11 and $z(i)=1-2x(i)$, $0 \le i \le 30$, is defined by the following equation with initial conditions $x(0)=0$, $x(1)=0$, $x(2), x(3)=0, x(4)=1$.

$$x(\bar{i}+5)=(x(\bar{i}+4)+x(\bar{i}+2)+x(\bar{i}+1)+x(\bar{i})) \bmod 2,\ 0 \le \bar{i} \le 25 \quad \text{[Equation 11]}$$

TABLE 4

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |

TABLE 4-continued

| $N_{ID}^{(1)}$ | $m_0$ | $m_1$ |
|---|---|---|
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 27 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. The UE which has performed the above-described procedure may perform reception of a PDCCH/PDSCH and transmission of a PUSCH/PUCCH as a normal UL/DL signal transmission procedure.

Figure 5:
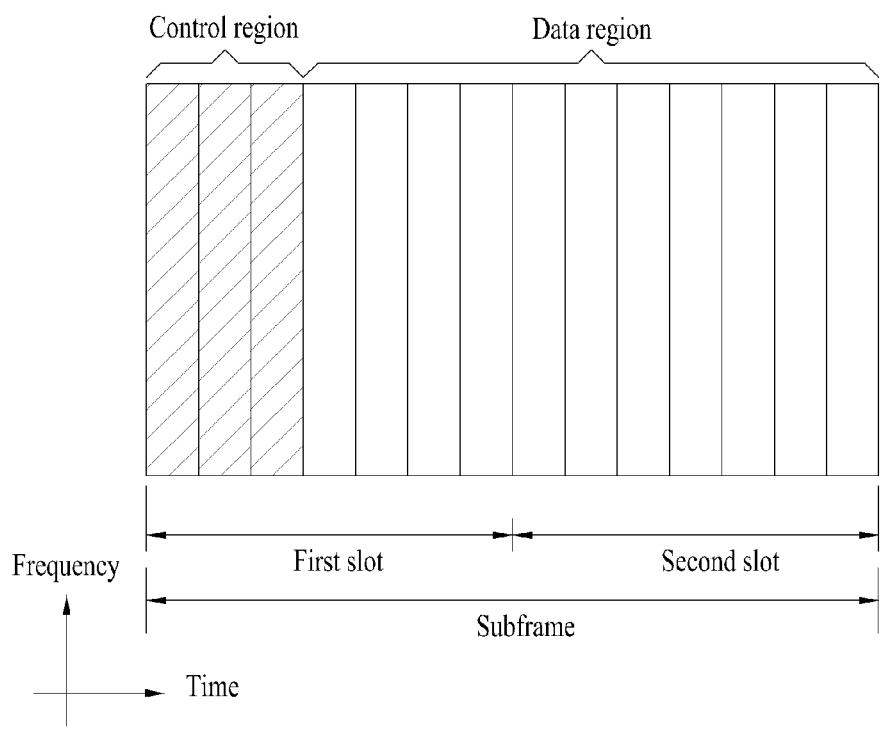
FIG. 5 illustrates the structure of a DL subframe used in a wireless communication system.

FIG. 5 illustrates the structure of a DL subframe used in a wireless communication system.

A DL subframe is divided into a control region and a data region in the time domain. Referring to FIG. 5, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. CCEs are numbered and used consecutively. In order to simplify a decoding process, the PDCCH having a format that includes n CCEs may only start on a CCE having a CCE number corresponding to a multiple of n. The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a TTF (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (UE SS) and is configured for each individual UE. The common SS (CSS) is configured for a plurality of UEs. The following table shows aggregation levels for defining SSs.

TABLE 5

| Search space $S_k^{(L)}$ | | | Number of PDCCH candidates $M^{(L)}$ |
|---|---|---|---|
| Type | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For the common search spaces, $Y_k$ is set to 0 for the aggregation levels L=4 and L=8. For the UE SS $S^{(L)}_k$ at aggregation level L, the variable $Y_k$ is defined by the following equation.

$$Y_k = (A \cdot Y_{k-1}) \bmod D \qquad \text{[Equation 12]}$$

In Equation 12, $Y_{-1} = n_{RNTI}$, A=39827, D=65537 and $k = \lfloor n_s/2 \rfloor$, $n_s$ is the slot number within a radio frame. SI-RNTI, C-RNTI, P-RNTI, RA-RNTI ant ect. may be used as an RNTI for $n_{RNTI}$.

For each serving cell on which PDCCH is monitored, the CCEs corresponding to PDCCH candidate m of the search space $S^{(L)}_k$ are given by the following equation.

$$L\{(Y_k + m') \bmod \lfloor N_{CCE,k}/L \rfloor\} + i \qquad \text{[Equation 13]}$$

In Equation 13, $Y_k$ may be defined by Equation 12, i=0, ..., L−1. For the common search space, m'=m. For the UE SS, for the serving cell on which PDCCH is monitored, if the monitoring UE is configured with carrier indicator field, for example, if a upper layer informs the UE of the existence of the carrier indicator field, then $m' = m + M^{(L)} \cdot n_{CI}$ where $n_{CI}$ is the carrier indicator field value. The carrier indicator field value is the same as a serving cell index (ServCellIndex) of a corresponding serving cell. The serving cell index is a short ID used to identify a serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies. In the meantime, if the monitoring UE is not configured with carrier indicator field (CIF) then m'=m, where m'=0, ..., $M^{(L)}$−1. $M^{(L)}$ is the number of PDCCH candidates to monitor in the given search space. For reference, the CIF is included in DCI and, in carrier aggregation, the CIF is used to indicate for which cell the DCI carries scheduling information. An eNB may inform the UE of whether the DCI received by the UE is capable of including the CIF through a higher layer signal. That is, the UE may be configured with the CIF by a higher layer. Carrier aggregation is described in more detail with reference to FIG. 10 and FIG. 11.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transmission block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Generally, a DCI format capable of being transmitted to a UE differs according to a transmission mode (TM) configured for the UE. In other words, for the UE configured for a specific TM, only some DCI format(s) corresponding to the specific TM rather than all DCI formats may be used. For example, the UE is semi-statically configured by higher layers so as to receive PDSCH data signaled through a PDCCH according to one of a plurality of predefined TMs. To maintain operation load of the UE according to blind decoding attempt at a predetermined level or less, all DCI formats are not always simultaneously searched by the UE.

In order for the UE to demodulate or decode a DL signal, an RS for estimating a channel between the UE and a node which has transmitted the DL signal is needed. A CRS defined in the LTE system may be used for both demodulation and measurement. A dedicated reference signal (DRS) is known to a specific UE and a CRS is known to all UEs. The CRS defined in the 3GPP LTE system can be a type of a common RS. For reference, since demodulation is a part of a decoding procedure, the term demodulation used in the present invention is interchangeable with the term decoding.

Figure 6:
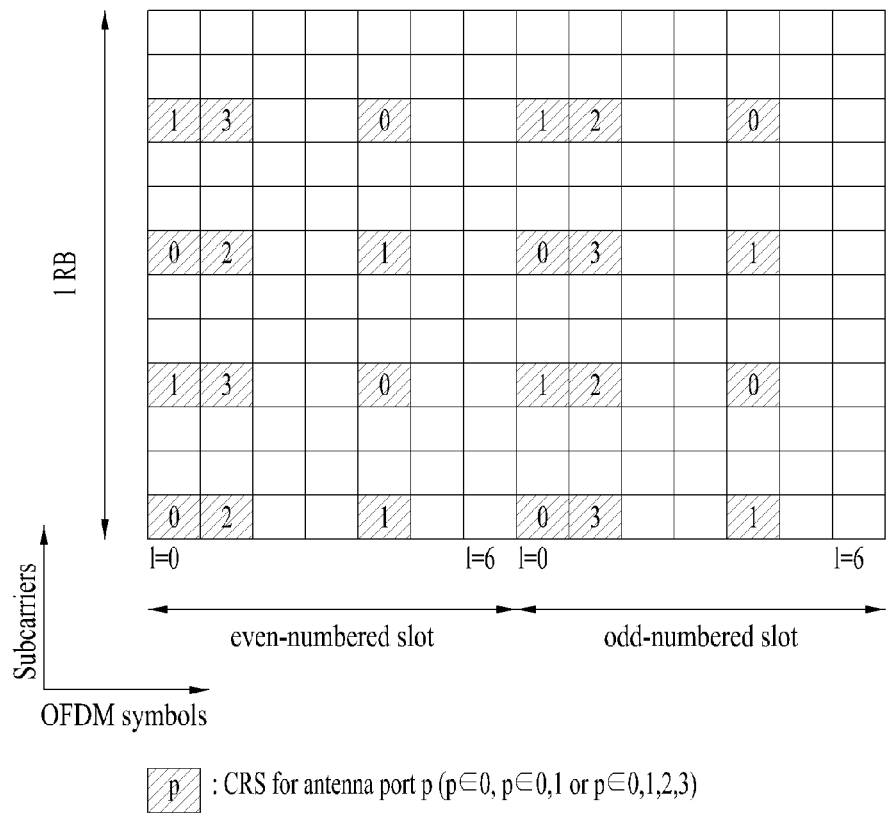
FIG. 6 illustrates configuration of cell specific common reference signals (CRSs).

FIG. 6 illustrates configuration of cell specific reference signals (CRSs). Especially, FIG. 6 illustrates configuration of CRSs for a 3GPP LTE system supporting a maximum of four antennas.

In a legacy 3GPP system, since a CRS is used for both demodulation and measurement, the CRS is transmitted over an entire DL BW in all DL subframes in a cell supporting PDSCH transmission and is transmitted over all antenna ports configured at an eNB.

Specifically, CRS sequence $r_{l,n_s}(m)$ is mapped to complex-valued modulation symbols $a_{k,l}^{(p)}$ used as reference symbols for antenna port p in slot $n_s$ according to Equation 14 below.

$$a_{k,l}^{(p)} = r_{l,n_s}(m') \qquad \text{[Equation 14]}$$

In Equation 14, $n_s$ denotes a slot number in a radio frame and l denotes an OFDM symbol in a slot determined according to Equation 15 below.

$$\begin{aligned}
k &= 6m + (v + v_{shift}) \bmod 6 \\
l &= \begin{cases} 0, N_{symb}^{DL} - 3 & \text{if } p \in \{0, 1\} \\ 1 & \text{if } p \in \{2, 3\} \end{cases} \\
m &= 0, 1, \ldots, 2 \cdot N_{RB}^{DL} - 1 \\
m' &= m + N_{RB}^{max,DL} - N_{RB}^{DL}
\end{aligned} \qquad \text{[Equation 15]}$$

where k denotes a subcarrier index, l denotes an OFDM symbol index, p denotes an antenna port number, and $N^{max,DL}_{RB}$ denotes the largest DL bandwidth configuration, expressed as an integer multiple of $N^{RB}_{sc}$.

Parameters v and $v_{shift}$ define locations for different RSs in the frequency domain and v is given as follows.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_S \bmod 2) & \text{if } p = 2 \\ 3 + 3(n_S \bmod 2) & \text{if } p = 3 \end{cases} \quad \text{[Equation 16]}$$

Cell-specific frequency shift $v_{shift}$ is given by Equation 17 according to physical layer cell identity $N^{cell}_{ID}$.

$$v_{shift} = N^{cell}_{ID} \bmod 6 \quad \text{[Equation 17]}$$

The UE may measure CSI using a CRS and demodulate a signal received on a PDSCH in a subframe including the CRS by using the CRS. That is, the eNB transmits the CRS at a predetermined location in each of all RBs and the UE performs channel estimation based on the CRS and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRS, since the eNB should transmit the CRS in all RBs, unnecessary RS overhead occurs. To solve such a problem, in a 3GPP LTE-A system, a UE-specific RS (hereinafter, UE-RS) and a CSI-RS are further defined in addition to the CRS. The UE-RS is used to perform demodulation and the CSI-RS is used to derive CSI. The UE-RS is one type of a DRS. The UE-RS and the CRS may be demodulation RSs in terms of usage because both signals are used for demodulation. The CSI-RS and the CRS may be measurement RSs in terms of usage because both signals are used for channel measurement or channel estimation.

Figure 7:
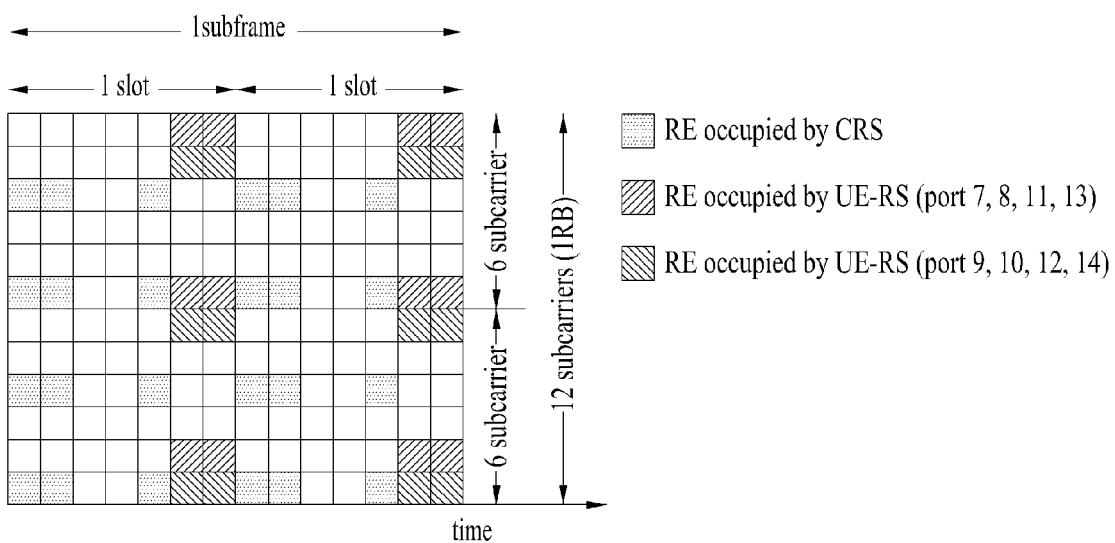
FIG. 7 illustrates UE-specific reference signals (UE-RSs).

FIG. 7 illustrates UE-specific reference signals (UE-RSs). In more detail, FIG. 7 illustrates REs occupied by UE-RSs among REs in one RB of a normal DL subframe having a normal CP.

UE-RSs are transmitted on antenna port(s) p=5, p=7, p=8 or p=7, 8, ..., u+6 for PDSCH transmission, where u is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. In addition, the UE-RS is transmitted only on antenna port(s) corresponding respectively to layer(s) of the PDSCH, unlike the CRS transmitted on all antenna port(s) regardless of the number of layers of the PDSCH. Accordingly, the UE-RS can reduce RS overhead relative to the CRS.

In the 3GPP LTE-A system, the UE-RSs are defined in a PRB pair. Referring to FIG. 7, in a PRB having frequency-domain index $n_{PRB}$ assigned for PDSCH transmission with respect to p=7, p=8, or p=7, 8, ..., D+6, a part of UE-RS sequence r(m) is mapped to complex-valued) modulation symbols $a_{k,l}^{(p)}$ a subframe according to the following equation.

$$a_{k,l}^{(p)} = w_p(l') \cdot r(3 \cdot l' \cdot N_{RB}^{max,DL} + 3 \cdot n_{PRB} m') \quad \text{[Equation 18]}$$

In Equation 18, $w_p(i)$, l', m' are given as follows.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad \text{[Equation 19]}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe} \\ & \text{with configuration 3, 4,} \\ & \text{or 8(see Table 2)} \\ l' \bmod 2 + 2 + 3\lfloor l'/2 \rfloor & \text{if in a special subframe} \\ & \text{with configuration 1, 2, 6,} \\ & \text{or 7(see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and} \\ & \text{in a special subframe} \\ & \text{with configuration 1, 2, 6} \\ & \text{or 7(see Table 2)} \\ 0, 1 & \text{if } n_s \bmod 2 = 0 \text{ and} \\ & \text{not in a special subframe} \\ & \text{with configuration 1, 2, 6,} \\ & \text{or 7(see Table 2)} \\ 2, 3 & \text{if } n_s \bmod 2 = 1 \text{ and} \\ & \text{not in a special subframe} \\ & \text{with configuration 1, 2, 6,} \\ & \text{or 7(see Table 2)} \end{cases}$$

$$m' = 0, 1, 2$$

In Equation 19, the sequence $\overline{w}_p(i)$ for normal CP is given according to the following table.

TABLE 20

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, ..., v+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 21]}$$

-continued $$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence defined by a length-31 Gold sequence. Output sequence c(n) (where n=0, 1, ..., $M_{PN}$-1) of length $M_{PN}$ is defined by Equation 22 below.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 22]}$$

In Equation 22, $N_C$=1600 and the first m-sequence is initialized with $x_1(0)$=1, $x_1(n)$=0, n=1, 2, ..., 30 and the second m-sequence is denoted by $c_{init} = \Sigma_{i=0}^{30} x_2(i) \cdot 2^i$ having a value depending on the application of the first m-sequence.

In Equation 21, a pseudo-random sequence generator for generation of c(i) is initialized with $c_{init}$ at the start of each subframe according to Equation 23 below.

$$c_{init} = (\lfloor n_s/2 \rfloor + 1) \cdot (2N_{ID}^{cell} + 1) \cdot 2^{16} + n_{SCID} \quad \text{[Equation 23]}$$

In Equation 23, the value of $n_{SCID}$ is set to 0 unless specified otherwise. For PDSCH transmission on antenna port 7 or 8, $n_{SCID}$ is given by DCI format 2B or 2C associated with PDSCH transmission. DCI format 2B is a DCI format for resource assignment for a PDSCH using a maximum of two antenna ports with a UE-RS and DCI format 2C is a DCI format for resource assignment for a PDSCH using a maximum of 8 antenna ports with the UE-RS.

Figure 8:
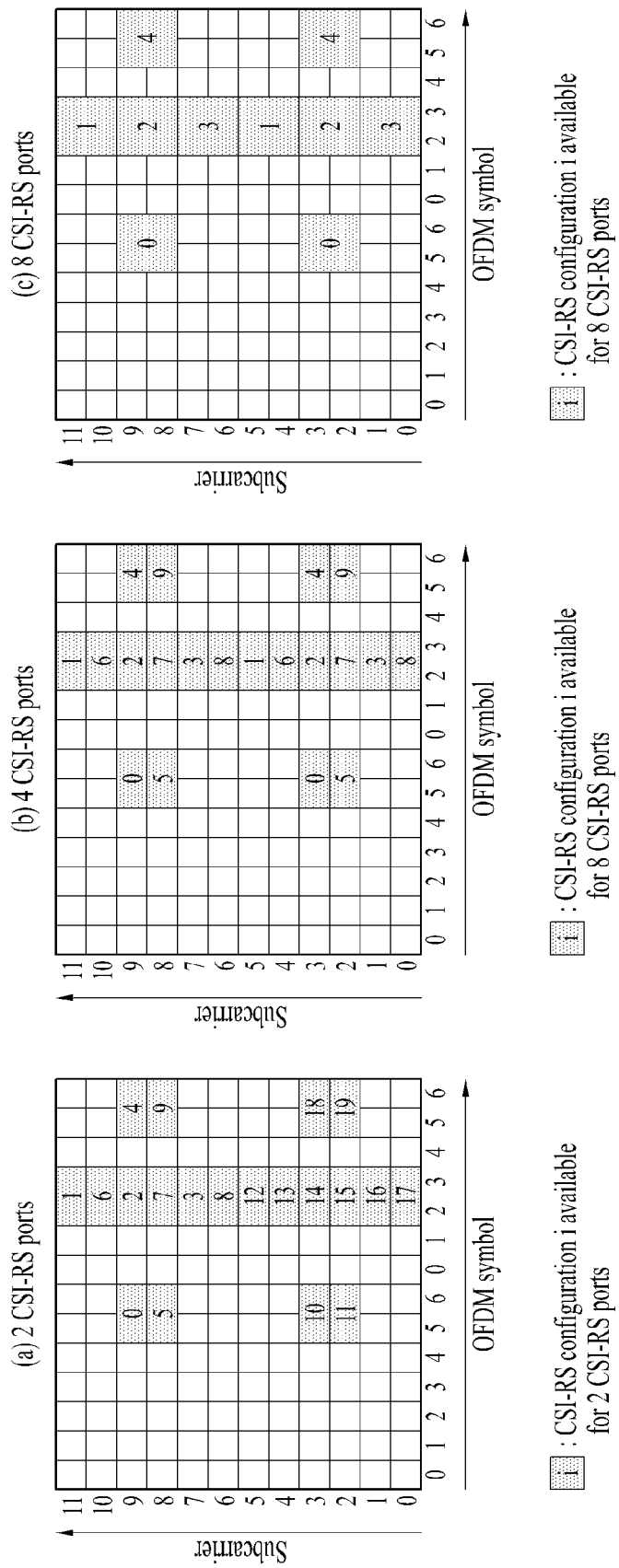
FIG. 8 illustrates CSI-RS configurations.

FIG. 8 illustrates CSI-RS configurations.

The CSI-RS is a DL RS introduced in the 3GPP LTE-A system, not for demodulation but for channel measurement. In the 3GPP LTE-A system, a plurality of CSI-RS configurations is defined for CSI-RS transmission. In subframes in which CSI-RS transmission is configured, CSI-RS sequence $r_{l,n_s}(m)$ is mapped to complex modulation symbols $a_{k,l}^{(p)}$ used as RSs on antenna port p according to the following equation.

$$a_{k,l}^{(p)} = w_{l''} \cdot r_{l,n_s}(m') \quad \text{[Equation 24]}$$

In Equation 24, $w_{l''}$, k, l are given by the following equation.

$$k = k' + 12m +$$ [Equation 25]

$$\begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' +$$

$$\begin{cases} l'' & \text{CSI reference signal configurations 0 - 19,} \\ & \text{normal cyclic prefix} \\ 2l'' & \text{CSI reference signal configurations 20 - 31,} \\ & \text{normal cyclic prefix} \\ l'' & \text{CSI reference signal configurations 0 - 27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

where (k', l') and necessary conditions on $n_s$ are given by Table 7 and Table 8 in a normal CP and an extended CP, respectively. That is, CSI-RS configurations of Table 7 and Table 8 denote locations of REs occupied by a CSI-RS of each antenna port in an RB pair.

TABLE 7

| | | Number of CSI reference signals configured | | | | | |
|---|---|---|---|---|---|---|---|
| CSI reference | | 1 or 2 | | 4 | | 8 | |
| signal configuration | | (k', l') | $n_s$ mod2 | (k', l') | $n_s$ mod2 | (k', l') | $n_s$ mod2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 8

| | | Number of CSI reference signals configured | | | | | |
|---|---|---|---|---|---|---|---|
| CSI reference | | 1 or 2 | | 4 | | 8 | |
| signal configuration | | (k', l') | $n_s$ mod2 | (k', l') | $n_s$ mod2 | (k', l') | $n_s$ mod2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |

TABLE 8-continued

| CSI reference signal configuration | Number of CSI reference signals configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| FS2 only 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

FIG. 8(a) illustrates 20 CSI-RS configurations 0 to 19 available for CSI-RS transmission through two CSI-RS ports among the CSI-RS configurations of Table 7, FIG. 8(b) illustrates 10 available CSI-RS configurations 0 to 9 through four CSI-RS ports among the CSI-RS configurations of Table 7, and FIG. 8(c) illustrates 5 available CSI-RS configurations 0 to 4 through 8 CSI-RS ports among the CSI-RS configurations of Table 7. The CSI-RS ports refer to antenna ports configured for CSI-RS transmission. For example, referring to Equation 25, antenna ports 15 to 22 correspond to the CSI-RS ports. Since CSI-RS configuration differs according to the number of CSI-RS ports, if the numbers of antenna ports configured for CSI-RS transmission differ, even the same CSI-RS configuration number corresponds to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 7 or Table 8 but also with subframes in which CSI-RSs are configured. That is, if subframes for CSI-RS transmission differ even when CSI-RS configuration numbers are the same in Table 7 or Table 8, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations. Hereinafter, in order to distinguish between a CSI-RS configuration to which a CSI-RS configuration number of Table 7 or Table 8 is assigned and a CSI-RS configuration varying according to a CSI-RS configuration number of Table 7 or Table 8, the number of CSI-RS ports, and/or a CSI-RS configured subframe, the CSI-RS configuration of the latter will be referred to as a CSI-RS resource configuration.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc. CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table shows CSI-RS subframe configuration $I_{CSI-RS}$, according to $T_{CSI-RS}$ and $\Delta_{CSI-RS}$.

TABLE 9

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes satisfying Equation 26 are subframes including a CSI-RS.

$$(10n_f+\lfloor n_s/2 \rfloor-\Delta_{CSI-RS}) \bmod T_{CSI-RS}=0 \qquad \text{[Equation 26]}$$

A UE configured as TM defined after the 3GPP LTE-A system (e.g. TM 9 or other newly defined TM) may perform channel measurement using a CSI-RS and demodulate or decode a PDSCH using the UE-RS.

Figure 9:
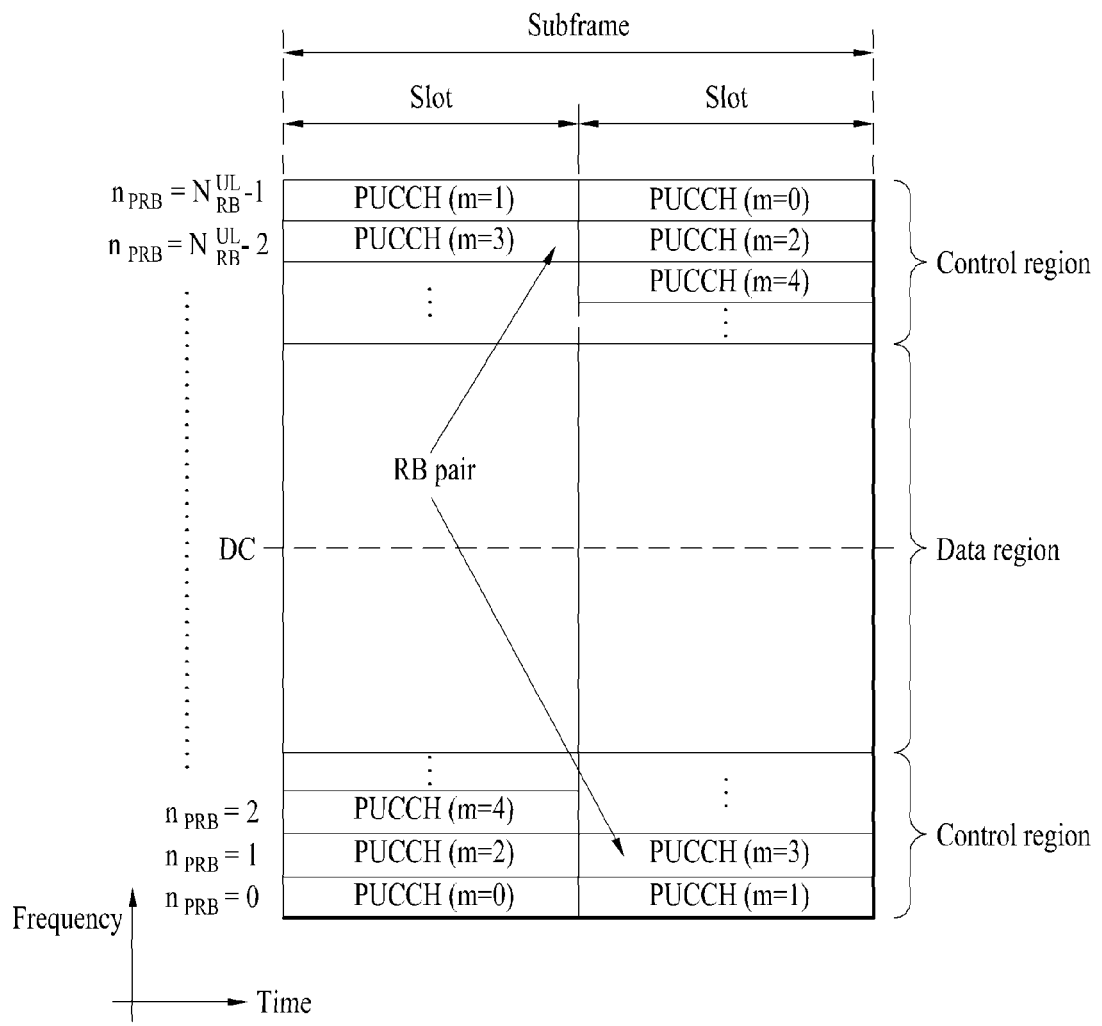
FIG. 9 illustrates the structure of a UL subframe used in a wireless communication system.

FIG. 9 illustrates the structure of a UL subframe used in a wireless communication system.

Referring to FIG. 9, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

Figure 10:
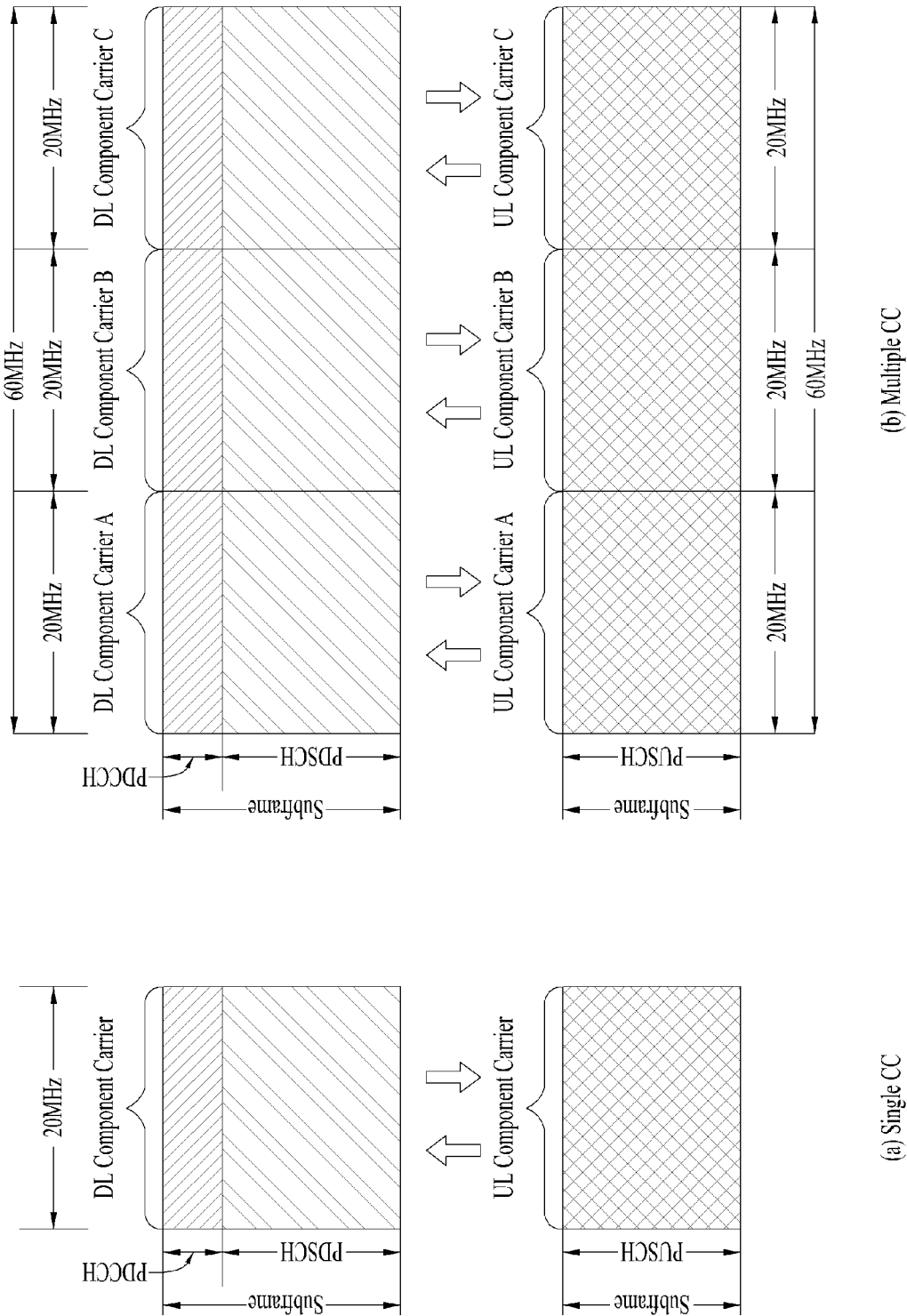
FIG. 10 is a diagram for explaining single-carrier communication and multi-carrier communication.

FIG. 10 is a diagram for explaining single-carrier communication and multi-carrier communication. Specially, FIG. 10(a) illustrates a subframe structure of a single carrier and FIG. 10(b) illustrates a subframe structure of multiple carriers.

Referring to FIG. 10(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 10(b), three 20 MHz CCs in each of UL and DL are aggregated to support a BW of 60 MHz. The CCs may be contiguous or non-contiguous in the frequency domain. Although FIG. 10(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 11:
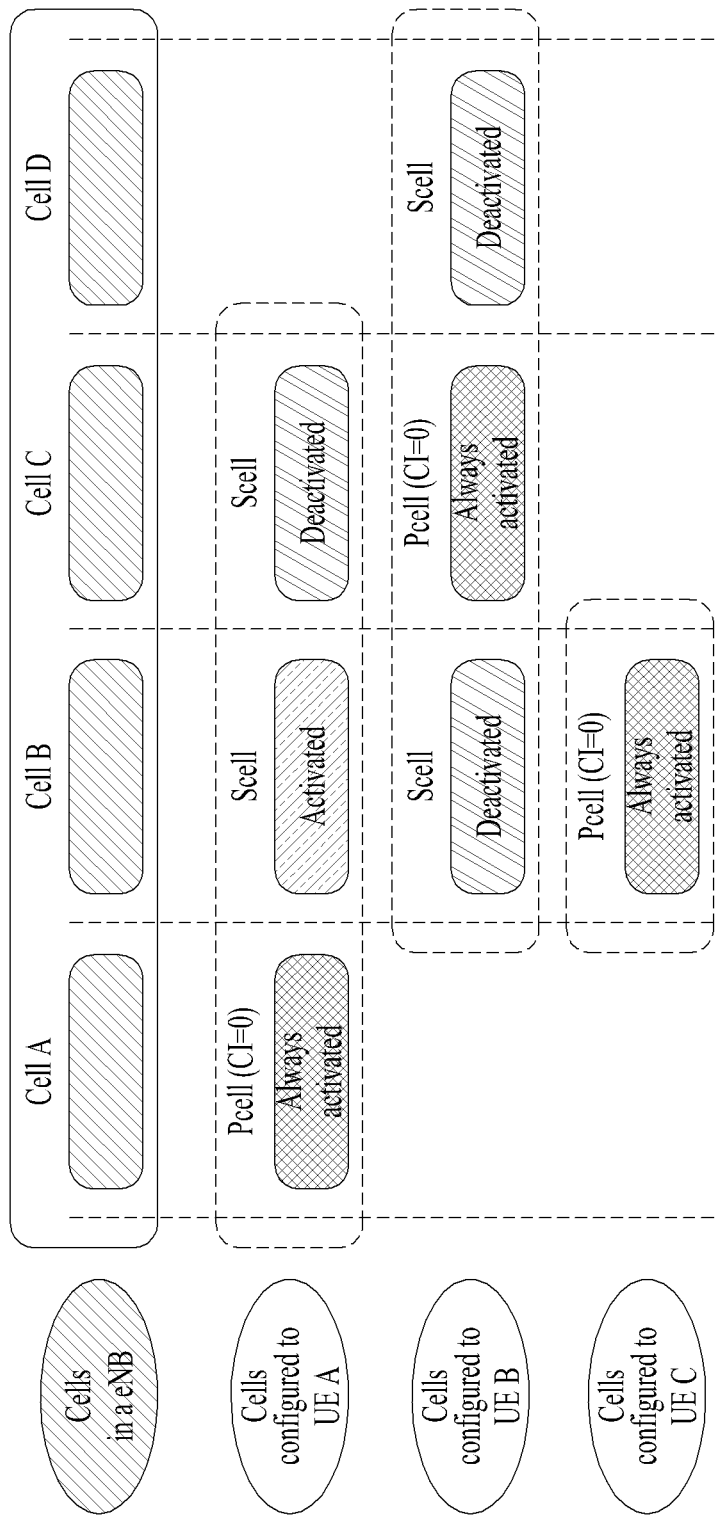
FIG. 11 illustrates the state of cells in a system supporting CA.

FIG. 11 illustrates the state of cells in a system supporting CA.

In FIG. 11, a configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, preserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. For reference, in FIG. 11, CI denotes a serving cell index and CI=0 is applied to Pcell. The serving cell index is a short ID used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term cell used in CA is distinguished from the term cell referring to a prescribed geographic region to which a communication service is provided by one eNB or one antenna group. To distinguish between a cell indicating a prescribed geographic region and a cell of CA, in the present invention, the cell of CA is referred to as a CC and the cell of a geographic region is referred to as a cell.

In a legacy LTE/LTE-A system, when a plurality of aggregated CCs is used, UL/DL frame time of an SCC is considered to be in synchronization with time of a PCC under the assumption that CCs which are not greatly separated in the frequency domain are aggregated. However, there is probability in the future that a plurality of CCs which belongs to different frequency bands or is considerably separated in terms of frequency, i.e. CCs having different propagation characteristics, are aggregated. Then, the assumption that the time of the PCC is synchronization with the time of the SCC may adversely affect synchronization of a DL/UL signal of the SCC.

Meanwhile, in the case of an LCT CC, radio resources usable for transmission/reception of physical UL/DL channels and radio resources usable for transmission/reception of physical UL/DL signals among radio resources operating on the LCT CC are predetermined as described in FIGS. 1 to 9. In other words, the LCT CC needs to be configured to carry the physical channels/signals not through an arbitrary time frequency on an arbitrary time resource but through a specific time frequency on a specific time resource according to a type of a physical channel or physical signal. For example, PDCCHs may be configured only on front OFDM symbol(s) among OFDM symbols of a DL subframe and a PDSCH cannot be configured on the front OFDM symbol(s) having the possibility that the PDCCHs are to be mapped. As another example, CRS(s) corresponding to antenna port(s) of an eNB are transmitted in every subframe on REs illustrated in FIG. 6 over all bands irrespective of a DL BW of the CC. Then, if the number of antenna ports of the eNB is one, REs indicated by '0' in FIG. 6 cannot be used for another DL signal transmission and, if the number of antenna ports of the eNB is four, REs indicated by '0', '1', '2', and '3' in FIG. 6 cannot be used for another DL signal transmission. In addition, various constraints on configuration of the LCT CC are present and such constraints have increased according to development of the communication system. Since some of these constraints were created due to a communication technology level at the time when the constraints were made, there are unnecessary constraints according to development of communication technology. In addition, a constraint on legacy technology and a constraint on new technology may be simultaneously present for the same purpose. In this way, as constraints have significantly increased, constraints introduced for development of the communication system make it rather difficult to efficiently use radio resources of the CC. For example, although a CRS need not be transmitted on all antenna ports in every subframe due to introduction of a CSI-RS and a UE-RS, the CRS is present per antenna port in every subframe in order to support the UE which cannot support the CSI-RS and UE-RS. However, since UEs which cannot support the CSI-RS/UE-RS will disappear over time, the necessity of using a legacy CRS having significant RS overhead together with the CSI-RS and UE-RS is gradually being reduced. In consideration of this state, it is necessary to configure the CC free from the constraints of the CRS.

Accordingly, introduction of an NCT CC which is free from unnecessary constraints due to advance of communication technology and is capable of being configured according to simpler constraints than conventional constraints has been discussed. Since the NCT CC is not configured according to constraints of a legacy system, the NCT CC cannot be recognized by a UE implemented by the legacy system. Hereinafter, a UE which is implemented according to the legacy system and cannot support the NCT CC will be referred to as a legacy UE and a UE which is implemented to support the NCT CC will be referred to as an NCT UE.

In the present invention, the NCT CC may not satisfy at least one of a constraint indicating that a CRS should be configured in every DL subframe in a cell, a constraint indicating that the CRS should be configured in the cell per antenna port of an eNB, and a constraint indicating that the CRS should be transmitted over all bands, and a constraint indicating that a predetermined number of front OFDM symbols of a DL subframe should be reserved for transmission of a control channel such as a PDCCH over an entire frequency band of a corresponding CC. For example, on the NCT CC, the CRS may be configured not in every subframe but in a predetermined number (>1) of subframes. Alternatively, on the NCT cell, only the CRS for one antenna port (e.g. antenna port 0) may be configured irrespective of the number of antenna ports of the eNB. Alternatively, a TRS for tracking of time synchronization and/or frequency synchronization may be newly defined instead of a legacy CRS for channel state measurement and demodulation. TRS may be configured in some subframes and/or on some frequency resources of the NCT CC. That is, on the LCT CC, the CRS is fixedly transmitted over an entire band on at least some front OFDM symbols in all subframes, in terms of an RS. In contrast, on the NCT CC, fixed CRS transmission having high density may be omitted or may be remarkably reduced. In addition, CRS transmission is fixed on the LCT CC, whereas the transmission time, transmission band, and transmission antenna ports of the CRS may be configurable in CRS transmission on the NCT CC. Alternatively, a PDSCH may be configured on front OFDM symbols of the NCT CC, a PDCCH may be configured in a legacy PDSCH region rather than the front OFDM symbols, or the PDSCH may be configured using some frequency resources of the PDCCH. Hereinafter, a CRS used only for tracking or a new RS will be referred to as a TRS. Since the TRS is not used for demodulation, the TRS corresponds to an RS for measurement in terms of usage. Alternatively, a DL resource can be efficiently used on the NCT CC by improving DL reception performance and minimizing RS overhead through UE-RS based DL data reception and (configurable) CSI-RS based channel state measurement having relatively low density. For example, on the LCT CC, a CRS is transmitted on DL by default, whereas, on the NCT CC, only a UE-RS for DL data demodulation and a CSI-RS for channel state measurement may be transmitted without the CRS.

In CA, the NCT CC may be used as an SCC. Since the NCT CC used as the SCC is not considered to be used by an LCT UE, the LCT UE need not perform cell search, cell selection, cell reselection, etc. on the NCT CC. If the NCT CC is not used as a PCC and is used only as the SCC, unnecessary constraints can be reduced as compared with the LCT CC which can also be used as the PCC and thus cells can be more efficiently used. However, it is considered that the NCT CC will be used as a stand-alone NCT CC capable of also being used as an independent PCC in the future. Hereinafter, the NCT CC which can be used only as the SCC will be referred to as an SCC-only NCT CC and the NCT CC which can be used as the PCC as well will be referred to as a stand-alone CC.

Since all of a PSS, an SSS, and a PBCH are configured on the LCT CC, a UE may freely detect the LCT CC and adjust synchronization with the LCT CC. In contrast, in the case of the NCT CC, it has not been determined yet whether all of the PSS, SSS, and PBCH will be configured on the NCT CC or only some of the PSS, SSS, and PBCH are configured on the NCT CC. Especially, when the NCT CC is used only as the SCC, the NCT CC which is carrier-aggregated as the SCC with the PCC may be categorized into a synchronized NCT CC which is in synchronization with another serving CC in time/frequency and an unsynchronized NCT CC which is out of synchronization with another serving CC in time/frequency. In the case of the synchronized NCT CC, time/frequency synchronization information of the synchronized NCT CC may be obtained through a synchronization RS carrier synchronized with the synchronized NCT CC. Accordingly, on the synchronized NCT CC, the PSS/SSS and/or TRS necessary for synchronization may not be transmitted or the UE may not use the PSS/SSS and/or the TRS even when the signal(s) are transmitted. However, since the synchronization RS carrier is used to obtain the time/frequency synchronization information of the synchronized NCT CC, it is assumed that the PSS/SSS and the TRS are configured on the synchronization RS carrier or that the synchronization RS carrier is a carrier on which the time/frequency synchronization information is transmitted.

Since the NCT CC and the LCT CC have different frame structures, the UE using an SCC-only NCT CC or a stand-alone CC (hereinafter, SCC-only/stand-alone CC) need to distinguish between an SCC-only/stand-alone CC and an LCT CC with respect to an arbitrary CC.

The present invention proposes a method for distinguishing between an SCC-only/stand-alone CC and an LCT CC by UEs using the SCC-only/stand-alone CC. In addition, the present invention proposes a method for distinguishing between time division duplex (TDD) and frequency division duplex (FDD) by UEs using an SCC-only/stand-alone CC. Moreover, the present invention proposes a method for distinguishing between an SCC-only NCT CC and a stand-alone CC by UEs. Furthermore, the present invention proposes a measurement method for radio resource management of an NCT CC.

A. LCT CC, SCC-Only NCT CC, Synchronized NCT CC, and Stand-Alone CC

FIG. 12 illustrates a TRS on a carrier according to the present invention.

On an SCC-only/stand-alone CC, a TRS with a period of a plurality of subframes (e.g. 5 ms) as illustrated in FIG. 12(*a*) for example is considered to be used for time/frequency tracking, instead of a CRS. In a subframe including the TRS, the TRS may be located on OFDM symbols #0 and #4 of slot 0 and OFDM symbols #0 and #4 of slot 1 as illustrated in FIG. 12(*b*). Meanwhile, on an NCT CC used only as an SCC, not transmitting a PBCH is considered. However, on the stand-alone CC, the PBCH or an enhanced PBCH (hereinafter, ePBCH) may be transmitted.

FIG. 13 illustrates a synchronization signal and a broadcast signal on an LCT CC. Especially, FIG. 13 illustrates the locations of OFDM symbols of PSS/SSS/PBCH in a subframe #0 of an LCT CC. Referring to FIG. 3, in subframe #5, the PSS/SSS are transmitted at the same locations as the locations illustrated in FIG. 13 but the PBCH is not transmitted.

When comparing an SCC-only NCT CC with a stand-alone CC, a PBCH (ePBCH), a common search space (CSS), an SIB, a paging signal, a multimedia broadcast multicast single frequency network (MBSFN) signal, etc. may not be transmitted on the SCC-only NCT CC. When comparing the SCC-only NCT CC with the stand-alone CC, since the SCC-only NCT CC is not used as a PCC, all or some of the PBCH (ePBCH), the SIB, and paging signal may not be transmitted on the SCC-only NCT CC.

When comparing the SCC-only NCT CC with the stand-alone CC, since the SCC-only NCT CC is not used as the PCC, the CSS may not be configured on the SCC-only NCT CC. In this case, a UE may not attempt to decode a PDCCH (or an enhanced PDCCH (EPDCCH)) in the CSS on the SCC-only NCT CC. Then the number of blind detection operations is reduced by number of blind detection operations needed when the UE reads the CSS. Therefore, the number of blind detection operations needed to read the CSS may be used as the number of blind detection operations of a UE-specific search space (USS) on the SCC-only NCT CC. That is, if the CSS is not used on the SCC-only NCT CC, the USS may be correspondingly increased. Then the number of PDCCH/EPDCCH candidates in the USS may be increased.

The PSS/SSS may be transmitted on the SCC-only NCT CC with a period other than 5 ms. Especially, the transmission period of the PSS/SSS on the SCC-only NCT CC may be increased to more than 5 ms (e.g. 10 ms or 20 ms). The transmission period of the PSS/SSS on the SCC-only NCT CC may be fixed to a specific period longer than 5 ms or may be configurable.

Upon attempting to perform initial access, if a CC corresponds to the SCC-only NCT CC, a UE does not perform radio resource management (RRM) (e.g. RSRP/RSRQ measurement) upon the CC or does not perform operation for receiving a PBCH/SIB. Therefore, upon attempting to perform initial access, if the UE confirms that the CC corresponds to the SCC-only NCT CC, the UE recognizes that the CC cannot be accessed thereby and may not perform operation for performing RRM upon the CC or receiving the PBCH/SIB. The UE attempts to perform RRM during initial access to a specific CC (or cell) to determine whether the quality of the CC (or cell) is good or not. This is because the UE need not attempt to perform RRM on the NCT CC used only as an SCC since the UE cannot initially access the SCC when the CC is used only as the SCC.

An eNB may request that the UE perform RRM upon a specific CC. RRM serves to provide mechanisms for causing the UE and a network to manage seamless mobility without excessive user intervention by providing mobility experience to the UE, guaranteeing efficient use of available radio resources, and causing the eNB to satisfy predefined radio resource related requirements. To provide support for seamless mobility, the UE may perform procedures including cell search, measurements, handover, and cell reselection.

The eNB may provide the UE with measurement configuration applicable to the UE, for RRM. For example, for RRM, the eNB transmits measurement configuration including a measurement object, reporting configuration, a measurement ID, quantity configuration, and a measurement gap to the UE so that the eNB may trigger measurement performed by the UE. The measurement object refers to an object that the UE should measure and may be, for example, a single E-UTRA carrier frequency for intra-frequency and inter-frequency measurement, a single UTRA frequency for inter-radio access technology (RAT) UTRA measurement, a set of GERAN carrier frequencies for inter-RAT GERAN measurement, and a set of cell(s) on a single carrier frequency for inter-RAT CDMA2000 measurement. Intra-frequency measurement refers to measurement on DL carrier frequency/frequencies of serving cell(s) and inter-frequency measurement refers to measurement on frequency/frequencies different from an arbitrary DL carrier frequency among DL carrier frequency/frequencies of serving cell(s). The reporting configuration refers to a list of reporting configurations and each reporting configuration is configured with a reporting criterion indicating a criterion for triggering transmission of measurement reporting of the UE, quantities that the UE should include for measurement reporting, and a reporting format indicating related information. The measurement ID refers to a list of measurement IDs and each measurement ID links one measurement object and one reporting configuration. By configuring a plurality of measurement IDs, it is possible to link one or more measurement objects to the same reporting configuration as well as one or more reporting configurations to the same measurement object. The measurement ID is used as a reference number in measurement reporting. The quantity configuration defines measurement quantities and related filtering, used for evaluation of all events and for related reporting of a measurement type. One filter may be configured per measurement quantity. The measurement gap indicates a period which can be used by the UE to perform measurement because no UL/DL transmission is scheduled.

Upon receiving the measurement configuration, the UE measures reference signal received power (RSRP) and reference signal received quality (RSRQ) using a CRS on a carrier frequency indicated as the measurement object. A cell-specific signal strength metric is provided through RSRP measurement. RSRP measurement is mainly used to determine priority of candidate cells (or candidate CCs) according to signal strength or is used as input for handover and cell reselection determination. The RSRP is defined as a linear average of power contribution of REs carrying a CRS within a considered frequency BW with respect to a specific cell (or a specific CC). The RSRQ serves to provide a cell-specific signal quality metric and is mainly used to determine priority of candidate cells (or candidate CCs) according to signal quality, similar to the RSRP. The RSRQ may be used as input for handover and cell reselection when, for example, RSRP measurement cannot provide information sufficient to perform reliable mobility determination. The RSRQ is defined as "N*RSRP/RSSI", where N is the number of RBs of an RSSI measurement BW. A received signal strength indicator (RSSI) is defined as various types of power including a total received wideband power, adjacent channel interference, thermal noise, etc., observed by the UE from all sources including co-channel serving and non-serving cells within a measurement BW. Therefore, the RSRQ may be the ratio of a pure RS power to a total power received by the UE.

In the case of the LCT CC, since the CRS is transmitted over an entire DL system BW of every DL subframe regardless of whether the LCT CC is configured as the SCC or as the PCC, the eNB need not inform the UE of information about the type of the LCT CC which is a measurement object. In contrast, in the case of the NCT CC, the CRS may be defined not to be transmitted, may be defined to be transmitted with a period corresponding to a plurality of subframes rather than every subframe even when the CRS is used as a TRS, or may be defined to be transmitted only on a partial band rather than the entire DL system, BW.

Accordingly, the present invention proposes informing the UE of a CC type or an RS type for RRM when the eNB requests that the UE perform RRM for a specific CC (or a specific CC). That is, the eNB may inform the UE of which CC type the CC, which is a measurement object, has among CC types (e.g. LCT, synchronized NCT, SCC-only NCT, stand-alone, etc.). Alternatively, the eNB may inform the UE of which measurement RS type the CC transmits.

Since a measurement RS transmitted on the CC differs according to the CC type and subframe(s) and BW in and on which the measurement RS is transmitted differ according to the CC type, the eNB may inform of how the UE should perform RRM by indicating the CC type to the UE. For example, the eNB may inform the UE of whether a CC requesting RRM is an LCT CC, an SCC-only NCT CC, or a stand-alone CC. As another example, the eNB may inform the UE of whether the CC requesting RRM is an SCC-only NCT CC or a stand-alone CC. As still another example, when the eNB requests that the UE perform RRM of a specific CC, the eNB may inform the UE of whether the specific CC is a synchronized NCT CC and/or of information about a synchronization reference carrier of the specific CC. The UE implemented to recognize the CC type may differently perform RRM according to the CC type of the specific CC. For example, if the specific CC is the LCT CC, the UE may perform RRM using the CRS and, if the specific CC is the NCT CC, the UE may perform RRM using the TRS.

The eNB may also inform the UE of the measurement RS type instead of the CC type. For instance, when the eNB requests that the UE perform RRM of a specific CC, the eNB may inform the UE of whether RRM should be performed upon the specific CC using the TRS or using the CSI-RS. Upon requesting that the UE perform RRM of the specific CC, the eNB may further inform the UE of BW information of the TRS of the specific CC. Upon requesting that the UE perform RRM of the specific CC, the eNB may inform the UE of CSI-RS resource configuration information (e.g. CSI-RS subframe configuration information, CSI-RS configuration information, etc.) of the specific CC.

The eNB may inform the UE of a list of information about CC types of neighbour cells (or neighbour CCs). The eNB may preinform the UE of information as to which CC types correspond to CCs for neighbour cells (or neighbour CCs) on which the UE will perform RRM later or on which there is possibility that the UE attempts connection. The information about the CC types may be information as to whether a corresponding CC is the LCT CC or the NCT CC or may be information as to whether the CC is the SCC-only NCT CC or the stand-alone CC. Alternatively, information as to whether an RS for measurement of the CC is a CRS, a TRS, or a CSI-RS may be used as the information about the CC types of the neighbour cells (or neighbour CCs).

Hereafter, methods of the present invention in which a UE detects a CC type will be described.

B. Detection of LCT CC and NCT CC

B-1. Detection in Step of Reading PSS/SSS

FIG. 14 illustrates an embodiment of the present invention for distinguishing between LCT and NCT.

When an SCC-only NCT CC and a stand-alone CC are collectively referred to as an NCT CC, if a relative distance between an OFDM symbol of a PSS and an OFDM symbol of an SSS on an LCT CC differs from that on an NCT CC, a UE may distinguish between the LCT CC and the NCT CC using difference in distance between the PSS and the SSS. For example, as illustrated in FIG. 14, if the SSS and the PSS are separated by one OFDM symbol on the LCT CC and by two OFDM symbols on the NCT CC, the UE supporting the NCT CC may distinguish the NCT CC from the LCT CC using a relative difference in distance between the SSS and the PSS.

As another example for distinguishing the NCT CC from the LCT CC, a method of changing a transmission order of the SSS and the PSS may be used. On the LCT CC, SSs are transmitted in order of the SSS and the PSS. Accordingly, if the transmission order of SSs is changed to PSS/SSS rather than SSS/PSS on the NCT CC, the UE using the NCT CC may distinguish the NCT CC from the LCT CC using the order of the SSS and the PSS.

To distinguish between the LCT CC and the NCT CC, a transmission period of a PSS/SSS on the LCT CC and a transmission period of the PSS/SSS on the NCT CC may be differently configured. Then, the UE may distinguish between the LCT CC and the NCT CC using the transmission period of the PSS/SSS. After receiving the PSS/SSS, the UE may distinguish between the LCT CC and the NCT CC by confirming when the next PSS/SSS is received. Especially, if the transmission period of the PSS/SSS is 5 ms as a result of confirming when the next PSS/SSS is received after the PSS/SSS is received, the UE may judge a corresponding CC to be the LCT CC and, if the transmission period of the PSS/SSS is longer than 5 ms, the UE may judge the CC to be the NCT CC.

To distinguish between the LCT CC and the NCT CC, a physical cell ID of an LCT CC and a physical cell ID of the NCT CC may be differently configured. For example, cell IDs used for the LCT CC and cell IDs used for the NCT CC may be differently configured. According to current 3GPP LTE/LTE-A, a physical cell ID, $N_{ID}^{cell}$, is expressed by $N_{ID}^{cell}=3N_{ID}^{(1)}+N_{ID}^{(2)}$. In this case, with respect to cell ID $N_{ID}^{(2)}$ which can be distinguished by the PSS, if $N_{ID}^{(2)}$ usable on the NCT CC and $N_{ID}^{(2)}$ usable on the LCT CC are differently configured, the UE may distinguish between the LCT CC and the NCT CC. Alternatively, with respect to cell ID group $N_{ID}^{(1)}$ which can be distinguished by the SSS, if $N_{ID}^{(1)}$ usable on the LCT CC and $N_{ID}^{(1)}$ usable on the NCT CC are differently configured, the UE may distinguish between the LCT CC and the NCT CC. To this end, the cell IDs usable on the LCT CC and the NCT CC may be predetermined or may be configured by a higher layer such as radio resource control (RRC) and transmitted to the UE.

B-2. Detection in Step of Reading TRS-FDD

Case in which Location of PSS/SSS of SCC-Only NCT CC/Stand-Alone CC is the Same as Location of PSS/SSS of LCT CC An OFDM symbol location of a PSS/SSS of an SCC-only/stand-alone CC may be the same as an OFDM symbol location of a PSS/SSS of an LCT CC in a subframe. The UE using the SCC-only/stand-alone CC may distinguish the SCC-only/stand-alone CC from the LCT CC by using a subframe in which a TRS is not transmitted. Referring to FIG. 12(a), on the SCC-only/stand-alone CC, it is considered that a CRS is used as the TRS which is periodically transmitted once per period corresponding to a plurality of subframes (e.g. 5 subframes). Therefore, the UE using the SCC-only/stand-alone CC attempts to detect the TRS (or CRS) at the location of a subframe in which the TRS is not transmitted in order to distinguish the SCC-only/stand-alone CC from the LCT CC. If no TRS (or CRS) is detected, the UE may recognize a corresponding CC as the SCC-only/stand-alone CC and, if the TRS (or CRS) is detected, the UE may judge the corresponding CC to be the LCT CC. Especially, if the location of a subframe in which the PSS/SSS is transmitted is the same as the location of a subframe in which the TRS is transmitted, the UE may detect the TRS (or CRS) in a subframe in which the PSS/SSS is not transmitted, thereby distinguishing the SCC-only/stand-alone CC from the LCT CC. Especially, if the location of a subframe in which the PSS/SSS is transmitted is not the same as the location of a subframe in which the TRS is transmitted, the UE may detect the TRS (or CRS) in a subframe in which the PSS/SSS is transmitted, thereby distinguishing the SCC-only/stand-alone CC from the LCT CC.

Case in which PSS/SSS of NCT is Changed

An OFDM symbol location of the PSS/SSS of the SCC-only/stand-alone CC may differ from an OFDM symbol location of the PSS/SSS of the LCT CC in a subframe.

1) Using Subframe in which TRS is Transmitted

FIGS. 15 and 16 illustrate another embodiment for distinguishing between LCT and NCT.

The UE may distinguish the SCC-only/stand-alone CC from the LCT CC by using the TRS according to an OFDM symbol location of the PSS/SSS of the SCC-only/stand-alone CC.

If the PSS/SSS of the SCC-only/stand-alone CC is located on OFDM symbols #1 and #2 of slot 0 or slot 1, the UE may determine whether the TRS (or CRS) is transmitted on the next OFDM symbol of the OFDM symbols on which the PSS/SSS are transmitted, thereby distinguishing between the LCT CC and the NCT CC. For example, referring to FIG. 15, the CRS is transmitted on the next OFDM symbol of the PSS/SSS OFDM symbols of the LCT CC, whereas, referring to FIG. 16, the TRS (or CRS) is not transmitted on the next OFDM symbol of the PSS/SSS OFDM symbols of the SCC-only/stand-alone CC.

If the PSS/SSS of the SCC-only NCT CC/stand-alone CC are located on OFDM symbols #2 and #3 of slot 0 or slot 1, the UE may determine whether the TRS (or CRS) is transmitted on the preceding OFDM symbol of the OFDM symbols on which the PSS/SSS are transmitted, thereby distinguishing between the LCT CC and the NCT CC.

If the PSS/SSS of the SCC-only/stand-alone CC are located on OFDM symbols #1 and #3 of slot 0 or slot 1, the UE may distinguish between the LCT CC and the NCT CC using signals transmitted before or after the PSS or SSS. That is, when the PSS is located on OFDM symbol #1 of slot 0 or slot 1 and the SSS is located on OFDM symbol #3 of slot 0 or slot 1, if the CRS (or TRS) is transmitted on the next OFDM symbol of the PSS symbol or if the SSS is transmitted on the preceding OFDM symbol of the PSS symbol, the UE may judge a corresponding CC to be a legacy CC and if the CRS (or TRS) is not transmitted on the next OFDM symbol of the PSS symbol or if the CRS (or TRS) is transmitted on the preceding OFDM symbol of the PSS symbol, the UE may judge the corresponding CC to be the NCT CC. Alternatively, when the PSS is located on OFDM symbol #1 of slot 0 or slot 1 and the SSS is located on OFDM symbol #3 of slot 0 or slot 1, if the PSS is transmitted on the next OFDM symbol of the SSS symbol or if the CRS (or TRS) is transmitted on the preceding the SSS symbol, the UE may judge a corresponding CC to be the LCT CC and if the TRS (or CRS) is transmitted on the next OFDM symbol of the SSS symbol or if the CRS (or TRS) is not transmitted on the preceding OFDM symbol of the SSS symbol, the UE may judge the corresponding CC to be the NCT CC.

Alternatively, when the SSS is located on OFDM symbol #1 of slot 0 or slot 1 and the PSS is located on OFDM symbol #3 of slot 0 or slot 1, if the PSS is transmitted on the next OFDM symbol of the SSS symbol, the UE may judge that a corresponding CC is the LCT CC and, if not, the UE may judge that the corresponding CC is the NCT CC. Alternatively, when the SSS is located on OFDM symbol #1 of slot 0 or slot 1 and the PSS is located on OFDM symbol #3 of slot 0 or slot 1, if the SSS is transmitted on the preceding OFDM symbol of the PSS symbol, the UE judges a corresponding CC to be the LCT CC and, if not, the UE may judge the corresponding CC to be the NCT CC.

2) Using Subframe in which TRS is not Transmitted

If an OFDM symbol of the PSS/SSS of the SCC-only/stand-alone CC is different from an OFDM symbol of the PSS/SSS of the LCT CC in a subframe, the UE using the SCC-only/stand-alone CC may distinguish the SCC-only/stand-alone CC from the LCT CC by using a subframe in which the TRS is not transmitted. Referring to FIG. 12(a), it is considered that the CRS is used as the TRS which is periodically transmitted once per period corresponding to a plurality of subframes (e.g. 5 subframes) on the SCC-only/stand-alone CC. Therefore, in order to distinguish the SCC-only/stand-alone CC from the LCT CC, the UE using the SCC-only/stand-alone CC may detect the TRS (or CRS) in a subframe in which the TRS is not transmitted. If the TRS (or CRS) is not detected in the subframe, the UE may judge a corresponding CC to be the SCC-only/stand-alone CC and, if the TRS (or CRS) is detected in the subframe, the UE may judge the corresponding CC to be the LCT CC. Especially, if the location of a subframe in which the PSS/SSS is transmitted is the same as the location of a subframe in which the TRS is transmitted, the UE detects the TRS (or CRS) in a subframe in which the PSS/SSS is not transmitted to distinguish the SCC-only/stand-alone CC from the LCT CC. Especially, if the location of a subframe in which the PSS/SSS is transmitted is not identical to the location of a subframe in which the TRS is transmitted, the UE may detect the TRS (or CRS) in a subframe in which the PSS/SSS is transmitted to distinguish the SCC-only/stand-alone CC from the LCT CC.

B-3. Detection in Step of Reading TRS-TDD

Case in which Both PSS and SSS are Transmitted in Downlink Subframe

1) Using Subframe in which TRS is Transmitted

According to the relation between the location of the PSS/SSS and the location of the TRS on the SCC-only/stand-alone CC, if the TRS is not transmitted on an OFDM symbol before a PSS symbol, the UE may recognize a corresponding CC as the LCT CC and, if not, the UE may recognize the corresponding CC as the NCT/stand-alone CC. Alternatively, if the TRS is not transmitted on an OFDM symbol after the PSS symbol, the UE may recognize the corresponding CC as the LCT CC and, if not, the UE may recognize the corresponding CC as the SCC-only/stand-alone CC. Alternatively, according to the relation between the location of the PSS/SSS and the location of the TRS on the SCC-only/stand-alone CC, if the TRS is transmitted on an OFDM symbol after an SSS symbol, the UE may recognize a corresponding CC as the LCT CC and, if not, the UE may recognize the corresponding CC as the SCC-only/stand-alone CC. Alternatively, if the TRS is not transmitted on an OFDM symbol before the PSS symbol, the UE may recognize the corresponding CC as the LCT CC and, if not, the UE may recognize the corresponding CC as the SCC-only/stand-alone CC.

2) Using Subframe in which TRS is not Transmitted

The UE using the SCC-only/stand-alone CC may distinguish the SCC-only/stand-alone CC from the LCT CC by using a subframe in which the TRS is not transmitted. Referring to FIG. 12(a), it is considered that the CRS is used as the TRS which is periodically transmitted once per period corresponding to a plurality of subframes (e.g. 5 subframes) on the SCC-only/stand-alone CC. Therefore, in order to distinguish the SCC-only/stand-alone CC from the LCT CC, the UE using the SCC-only/stand-alone CC detects the TRS (or CRS) in a subframe in which the TRS is not transmitted. If the TRS (or CRS) is not detected in the subframe, the UE may recognize a corresponding CC as the SCC-only/stand-alone CC and, if the TRS (or CRS) is detected in the subframe, the UE may recognize the corresponding CC as the LCT CC. Especially, if the location of a subframe in which the PSS/SSS is transmitted is the same as the location of a subframe in which the TRS is transmitted, the UE may detect the TRS (or CRS) in a subframe in which the PSS/SSS is not transmitted to distinguish the SCC-only/stand-alone CC from the LCT CC. Especially, the UE may detect the TRS (or CRS) in a special subframe. If the TRS (or CRS) is detected in the special subframe, the UE may recognize a corresponding CC as the LCT CC and, if not, the UE may recognize the corresponding CC as the SCC-only/stand-alone CC.

Case in which Both PSS/SSS are Transmitted in Special Subframe

The UE using the SCC-only/stand-alone CC detects the TRS (or CRS) in an arbitrary special subframe or a special subframe in which the PSS/SSS are transmitted. If the TRS (or CRS) is detected in the subframe, the UE may recognize a corresponding CC as the LCT CC and, if not, the UE may recognize the corresponding CC as the SCC-only/stand-alone CC. Alternatively, if the TRS is transmitted on the next OFDM symbol of an SSS OFDM symbol, the UE may recognize the corresponding CC as the LCT CC and, if not, the UE may recognize the corresponding CC as the SCC-only/stand-alone CC. Alternatively, if the TRS (or CRS) is detected on OFDM symbol #0 in the special subframe, the UE may recognize the corresponding CC as the LCT CC and, if not, the UE may recognize the corresponding CC as the as the SCC-only/stand-alone CC.

Case in which PSS and SSS are Transmitted in Downlink Subframe and Special Subframe The UE using the SCC-only/stand-alone CC detects the TRS (or CRS) in an arbitrary special subframe or a special subframe in which the PSS or SSS is transmitted. If the TRS (or CRS) is detected in the subframe, the UE may recognize a corresponding CC as the LCT CC and, if not, the UE may recognize the corresponding CC as the SCC-only/stand-alone CC. Alternatively, if the TRS (or CRS) is detected on OFDM symbol #0 in the special subframe in which the PSS or SSS is transmitted, the UE may recognize the corresponding CC as the LCT CC and, if not, the UE may recognize the corresponding CC as the as the SCC-only/stand-alone CC.

Case in which Location of PSS/SSS of NCT is the Same as Location of PSS/SSS of LCT The UE using the SCC-only/stand-alone CC detects the TRS (or CRS) in a certain special subframe or a special subframe in which the PSS is transmitted. If the TRS (or CRS) is detected in the subframe, the UE may recognize a corresponding CC as the LCT CC and, if not, the UE may recognize the corresponding CC as the SCC-only/stand-alone CC. Alternatively, if the TRS (or CRS) is detected on OFDM symbol #0 in the special subframe in which the PSS or SSS is transmitted, the UE may recognize the corresponding CC as the LCT CC and, if not, the UE may recognize the corresponding CC as the as the SCC-only/stand-alone CC.

B-4. Detection in Step of Reading PBCH

Case in which Location of PSS/SSS of LCT is the Same as Location of PSS/SSS of LCT CC The UE which can use the SCC-only NCT CC may distinguish between the LCT CC and the SCC-only NCT CC by determining whether the PBCH is transmitted at the location of the PBCH of the LCT CC. For example, referring to FIG. 13, if the PBCH is transmitted at the location of a PBCH OFDM symbol indicated in FIG. 13, the UE may recognize a corresponding CC as the LCT CC and, if not, the UE may recognize the corresponding CC as the SCC-only NCT CC.

In order for the UE which can use the stand-alone CC to distinguish between the LCT CC and the stand-alone CC, the location of an OFDM symbol of the PBCH or EPBCH of the stand-alone CC may be different from the location of an OFDM symbol of the PBCH of the LCT CC. In this case, the UE may judge the LCT and the stand-alone CC by using a relative difference in distance between the PSS/SSS and the PBCH. Alternatively, in order for the UE which can use the stand-alone CC to judge the LCT CC and the stand-alone CC, information as to whether a corresponding CC is the LCT CC or the stand-alone CC may be carried on the PBCH or EPBCH of the stand-alone CC. Alternatively, the number of OFDM symbols for the PBCH or the EPBCH on the stand-alone CC may become different from the number of OFDM symbols of the PBCH on the LCT CC, so that the UE may determine whether the corresponding CC is the LCT CC or the stand-alone CC. Alternatively, the UE may determine whether the corresponding CC is the LCT CC or the stand-alone CC by using a PBCH of a type different from the PBCH on the LCT CC, which can be recognized only by the UE supporting the stand-alone CC.

Case in which Location of PSS/SSS of NCT is Changed

The UE which can use the SCC-only/stand-alone CC may distinguish between the LCT CC and the SCC-only/stand-alone CC by determining whether the PBCH is transmitted at the location of an OFDM symbol of the PBCH relative to the PSS/SSS of the LCT CC. For example, referring to FIG. 13, if the PBCH is transmitted at the location of a PBCH OFDM symbol indicated in FIG. 13, the UE may recognize a corresponding CC as the LCT CC and, if not, the UE may recognize the corresponding CC as the SCC-only NCT CC.

The UE which can use the stand-alone CC may judge the LCT CC and the stand-alone CC by using a relative difference in distance between the PSS/SSS and the PBCH. Alternatively, in order for the UE which can use the stand-alone CC to judge the LCT CC and the stand-alone CC, information as to whether a corresponding CC is the LCT CC or the stand-alone CC may be carried on the PBCH or EPBCH of the stand-alone CC. Alternatively, the number of OFDM symbols for the PBCH or the EPBCH on the stand-alone CC may become different from the number of OFDM symbols of the PBCH on the LCT CC, so that the UE may determine whether the corresponding CC is the LCT CC or the stand-alone CC. Alternatively, the UE may determine whether the corresponding CC is the LCT CC or the stand-alone CC by using a PBCH of a type different from the PBCH on the LCT CC, which can be recognized only by the UE supporting the stand-alone CC.

C. Detection of SCC-Only NCT CC and Stand-Alone CC

The present invention proposes a method for distinguishing between the NCT CC and the stand-alone CC by the UE in an LTE-A system.

In the SCC-only NCT CC, the PSS/SSS may have a transmission period other than 5 ms. Especially, in the SCC-only NCT CC, the transmission of the PSS/SSS may be increased to a period (e.g. 10 ms or 20 ms) longer than 5 ms. The transmission period of the PSS/SSS transmitted on the SCC-only NCT CC may be fixed to a specific period longer than 5 ms or may be configurable.

C-1. Detection in Step of Reading PSS/SSS

If a relative distance between OFDM symbols of the PSS and the SSS on the SCC-only NCT CC becomes different from a relative distance between OFDM symbols of the PSS and the SSS on the stand-alone CC, the UE may distinguish the SCC-only NCT CC and the stand-alone CC using the relative distances.

As another method for distinguishing between the SCC-only NCT CC and the stand-alone CC, a method of changing a transmission order of the SSS and the PSS may be used. If a transmission order of SSs is SSS/PSS on the SCC-only NCT CC and is PSS/SSS on the stand-alone CC, the UE may distinguish between the SCC-only NCT CC and the stand-alone CC using the transmission order of the SSS and the PSS. Alternatively, if the transmission order of SSs is PSS/SSS on the SCC-only NCT CC and is SSS/PSS on the stand-alone CC, the UE may distinguish between the SCC-only NCT CC and the stand-alone CC using the transmission order of the SSS and the PSS.

If the transmission periods of the PSS/SSS on the SCC-only NCT CC and stand-alone CC are differently defined, the UE may distinguish between the SCC-only NCT CC and the stand-alone CC using the transmission periods of the PSS/SSS. The UE may distinguish between the SCC-only NCT CC and the stand-alone CC by confirming when the next PSS/SSS is received after the PSS/SSS is received. Especially, as a result of confirming when the next PSS/SSS is received after the PSS/SSS is received, if the transmission period of the PSS/SSS is 5 ms, the UE may judge a corresponding CC to be the stand-alone CC and, if the transmission period of the PSS/SS is longer than 5 ms, the UE may judge the corresponding CC to be SCC-only NCT CC.

To distinguish between the SCC-only NCT CC and the stand-alone CC, physical cell IDs may be differently configured with respect to the SCC-only NCT CC and the stand-alone CC. For example, a cell ID which can be used for the SCC-only NCT CC and a cell ID which can be used for the stand-alone CC may be differently configured. According to current 3GPP LTE/LTE-A, physical cell ID $N_{ID}^{cell}$ is expressed by $N_{ID}^{cell}=3N_{ID}^{(1)}+N_{ID}^{(2)}$. With respect to $N_{ID}^{(2)}$ which can be distinguished by the PSS, if $N_{ID}^{(2)}$ which can be used on the SCC-only NCT CC is configured differently from a cell ID $N_{ID}^{(2)}$ which can be used on the SCC-only NCT CC, the UE may distinguish the SCC-only NCT CC and the stand-alone CC, the UE may distinguish between the SCC-only NCT CC and the stand-alone CC. Alternatively, with respect to cell group ID $N_{ID}^{(1)}$ which can be distinguished by the SSS, if $N_{ID}^{(1)}$ which can be used on the SCC-only NCT CC is different from $N_{ID}^{(1)}$ which can be used on the stand-alone CC, the UE may distinguish between the SCC-only NCT CC and the stand-alone CC. To this end, the cell IDs usable on the LCT CC and the NCT CC may be predetermined or may be configured by a higher layer such as RRC and transmitted to the UE.

C-2. Detection in Step of Reading TRS

According to the relation between the location of the PSS/SSS and the location of the TRS on the SCC-only NCT CC and the stand-alone CC, the UE may distinguish between the SCC-only NCT CC and the stand-alone CC by confirming whether the TRS is transmitted on an OFDM symbol before/after the PSS/SSS. If the TRS is not transmitted on an OFDM symbol before an OFDM symbol on which the PSS is transmitted, the UE may recognize a corresponding CC as the SCC-only NCT CC and, if not, the UE may recognize the corresponding CC as the stand-alone CC. Alternatively, if the TRS is not transmitted on an OFDM symbol after an OFDM symbol on which the PSS is transmitted, the UE may recognize the corresponding CC as the SCC-only LCT CC and, if not, the UE may recognize the corresponding CC as the stand-alone CC. Alternatively, according to the relation between the location of the PSS/SSS and the location of the TRS on the SCC-only NCT CC, if the TRS is transmitted on an OFDM symbol after an OFDM symbol on which the SSS is transmitted, the UE may recognize a corresponding CC as the SCC-only NCT CC and, if not, the UE may recognize the corresponding CC as the stand-alone CC. Alternatively, if the TRS is not transmitted on an OFDM symbol before an OFDM symbol on which the PSS is transmitted, the UE may recognize the corresponding CC as the SCC-only NCT CC and, if not, the UE may recognize the corresponding CC as the stand-alone CC.

To distinguish between the SCC-only NCT CC and the stand-alone CC, relative distances of subframes in which the PSS/SSS and the TRS are transmitted on the SCC-only NCT CC and the stand-alone CC may be differently configured. For example, when the PSS/SSS is transmitted in subframe #0, the TRS is transmitted in subframe #0 on the SCC-only NCT CC and the TRS is transmitted in one (especially, subframe #1) of subframes #1, #2, #3, and #4 on the stand-alone CC, so that the UE may distinguish between the SCC-only NCT CC and the stand-alone CC. Conversely, when the PSS/SSS is transmitted in subframe #0, the TRS is transmitted in subframe #0 on the stand-alone CC and the TRS is transmitted in one (especially, subframe #1) of subframes #1, #2, #3, and #4 on the SCC-only NCT CC, so that the UE may distinguish between the SCC-only NCT CC and the stand-alone CC.

Figure 17:
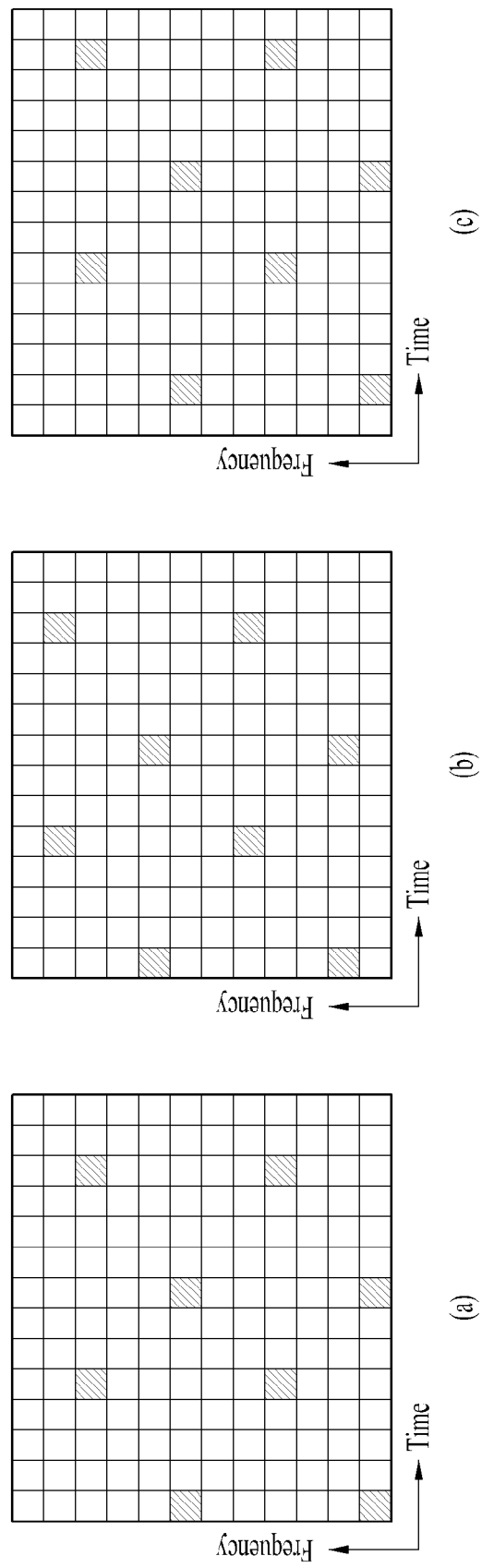
FIG. 17 illustrates another embodiment of the present invention for distinguishing between an NCT CC usable only as a secondary carrier and an NCT CC usable also as a primary CC.

FIG. 17 illustrates another embodiment of the present invention for distinguishing between an NCT CC usable only as a secondary carrier and an NCT CC usable also as a primary CC.

To distinguish between the SCC-only NCT CC and the stand-alone CC, TRS shifted degrees in the time domain or the frequency domain on the SCC-only NCT CC and the stand-alone CC may be differently configured. Referring to FIG. 17, the location of an OFDM symbol on which the TRS is transmitted is shifted with respect to the SCC-only NCT CC or the stand-alone CC, so that the UE may distinguish between the SCC-only NCT CC and the stand-alone CC. Alternatively, cell-specific frequency shift (v-shift) $v_{shift}$ of the TRS may be differently configured with respect to the SCC-only NCT CC or the stand-alone CC, so that the UE may distinguish between the SCC-only NCT CC and the stand-alone CC. For example, if v-shift $v_{shift}$ of the TRS for a specific cell ID is N, $v_{shift}$ of 'N+a' may be applied to the TRS on the SCC-only NCT CC and $v_{shift}$ of 'N+b' may be applied to the TRS on the stand-alone CC. Alternatively, if $v_{shift}$ of the TRS for a specific cell ID is N, $v_{shift}$ of N may be applied to the TRS on the SCC-only NCT CC and $v_{shift}$ of 'N+1' may be applied to the TRS on the stand-alone CC. Alternatively, if $v_{shift}$ of the TRS for a specific cell ID is N, $v_{shift}$ of N is applied to the TRS on the stand-alone CC and $v_{shift}$ of N+1 may be applied to the TRS on the SCC-only NCT CC.

C-3. Detection in Step of Reading PBCH

The PBCH (or ePBCH) may not be transmitted on the SCC-only NCT CC and the PBCH (or ePBCH) may be transmitted on the stand-alone CC. Therefore, the UE may distinguish between the SCC-only NCT CC and the stand-alone CC by confirming whether the PCH (or ePBCH) is transmitted at the location at which the PBCH (or ePBCH) of the stand-alone CC is to be transmitted.

D. Detection of FDD and TDD

The present invention proposes a method for distinguishing between FDD and TDD on the SCC-only/stand-alone CC.

D-1. Detection in Step of Reading PSS/SSS

If relative distances of OFDM symbols of the PSS and the SSS on the SCC-only/stand-alone are differently configured with respect to FDD and TDD, the UE may distinguish between FDD and TDD in the SCC-only/stand-alone CC.

As another method for distinguishing between FDD and TDD on the SCC-only/stand-alone CC, a method of changing a transmission order of the SSS and the PSS may be used. If, in FDD, SSs are transmitted in order of the SSS/PSS and, in TDD, SSs are transmitted in order of the PSS/SSS, the UE may distinguish between FDD and TDD using the order of the SSS and the PSS. Alternatively, if, in FDD, SSs are transmitted in order of the PSS/SSS and, in TDD, SSs are transmitted in order of the SSS/PSS, the UE may distinguish between FDD and TDD using the order of the SSS and the PSS.

D-2. Detection in Step of Reading TRS

According to the relation between the location of the PSS/SSS and the location of the TRS in FDD and the relation between the location of the PSS/SSS and the location of the TRS in TDD, if the TRS is not transmitted on OFDM symbol before and/or after an OFDM symbol on which the PSS and/or the SSS is transmitted, the UE may recognize a corresponding CC as a CC in FDD and, if not, the UE may recognize the corresponding CC as a CC in TDD. Conversely, if the TRS is transmitted on OFDM symbol before and/or after an OFDM symbol on which the PSS and/or the SSS is transmitted, the UE may recognize a corresponding CC as a CC in TDD and, if not, the UE may recognize the corresponding CC as a CC in FDD.

Especially, when, in FDD, the PSS/SS is transmitted in a subframe in which the TRS is transmitted and, in TDD, the PSS/SSS is transmitted in a subframe in which the TRS is not transmitted or in a special subframe, if the TRS is detected in a subframe in which the PSS/SSS is transmitted, the UE may recognize a corresponding CC as a CC in FDD and, if not, the UE may recognize the corresponding CC as a CC in TDD. Alternatively, when, in FDD, the PSS/SS is transmitted in a subframe in which the TRS is transmitted and, in TDD, the SSS is transmitted in a subframe in which the TRS is transmitted and the PSS is transmitted in a special subframe, if the TRS is detected in a subframe in which the PSS is transmitted, the UE may recognize a corresponding CC as a CC in FDD and, if not, the UE may recognize the corresponding CC as a CC in TDD. This example corresponds to the case in which the PSS/SSS is transmitted by a legacy carrier transmission scheme in both FDD and TDD.

D-3. Detection in Step of Reading PBCH

In a stand-alone CC environment, information as to whether a corresponding CC is a CC in FDD or a CC in TDD may be carried on the PBCH or ePBCH of the stand-alone CC in order to distinguish between FDD and TDD.

In the stand-alone CC, if the location of the PSS/SSS in FDD is different from the location of the PSS/SSS in TDD, the UE may distinguish between FDD and TDD using a distance difference between the PSS/SSS and the PBCH in FDD and a distance difference between the PSS/SSS and the PBCH in TDD.

In the stand-alone CC, the location of an OFDM symbol of the PSS/SSS in FDD is the same as the location of an OFDM symbol of the PSS/SSS in TDD, the location of an OFDM symbol of the PBCH or the ePBCH in FDD may be different from the location of an OFDM symbol of the PBCH or the ePBCH in TDD. In this case, the UE may distinguish between FDD and TDD using the distance difference between the PSS/SSS and the PBCH in FDD and the distance difference between the PSS/SSS and the PBCH in TDD.

Figure 18:
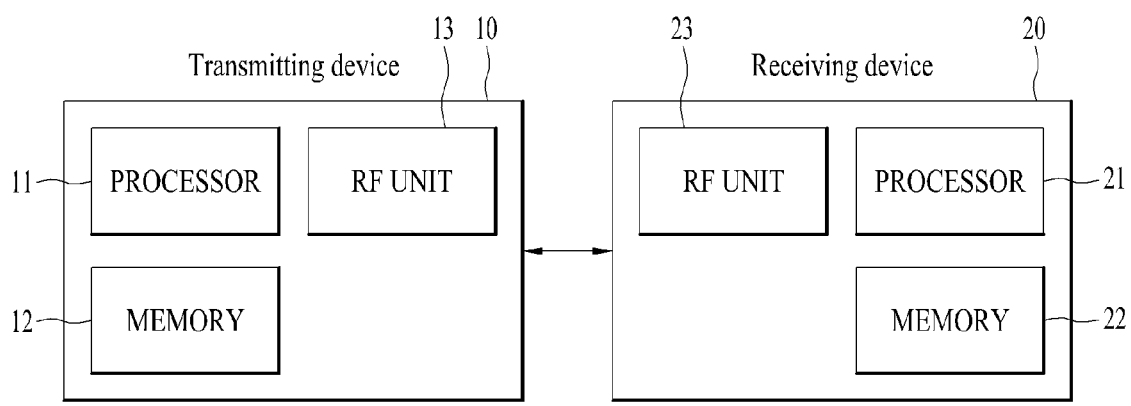
FIG. 18 is a block diagram illustrating elements of a transmitting device and a receiving device for implementing the present invention.

FIG. 18 is a block diagram illustrating elements of a transmitting device 10 and a receiving device 18 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may control the eNB RF unit to transmit a PSS/SSS, a TRS, and/or a PBCH on an NCT CC according to any one of the above-described embodiments B-1 to B-4 of the present invention. For example, the eNB processor of the present invention may control the eNB RF unit to transmit the PSS/SSS on the NCT CC on OFDM symbol(s) other than OFDM symbol(s) of an LCT CC, control the eNB RF unit to transmit the PSS/SSS on the NCT CC at a transmission period different from a transmission period of the PSS/SSS of the LCT CC, control the eNB RF unit to transmit the PSS and the SSS on the NCT CC by a transmission order different from a transmission order of the PSS and the SSS of the LCT CC, control the eNB RF unit to transmit the PBCH on the NCT CC by using a type different from the PBCH of the LCT CC, control the eNB RF unit to transmit the PBCH of the NCT CC on a number of OFDM symbols different from a number of OFDM symbols for the PBCH of the LCT CC, or control the eNB RF unit to transmit the PBCH carrying type information of a corresponding CC on the NCT CC. The UE processor of the present invention may control the UE RF unit to receive the PSS/SSS, the TRS, and/or the PBCH on the NCT CC according to one of the above-described embodiments B-1 to B-4 of the present invention. For example, the UE processor of the present invention may control the UE RF unit to receive the PSS/SSS on OFDM symbols(s) on the NCT CC rather than on the LCT CC, control the UE RF unit to receive the PSS and the SSS on the NCT CC by a transmission order different from a transmission order of the PSS and the SSS on the LCT CC, control the UE RF unit to receive the PBCH on the NCT CC by a type different from the PBCH of the LCT CC, control the UE RF unit to receive the PBCH of the NCT CC on a number of OFDM symbols different from a number of OFDM symbols for the PBCH of the LCT CC, or control the UE RF unit to receive the PBCH carrying type information of a corresponding CC on the NCT CC. The UE processor may distinguish between the NCT CC and the LCT CC based on the PSS/SSS, the TRS, and/or the PBCH received on the NCT CC.

The eNB processor of the present invention may control the eNB RF unit to transmit the PSS/SSS, the TRS, and/or the PBCH on the SCC-only CC or the NCT CC so as to distinguish between the SCC-only NCT CC and the stand-alone CC, according to one of the above-described embodiments C-1 to C-3 of the present invention. The UE RF unit of the present invention may receive the PSS/SSS, the TRS, and/or the PBCH on a CC transmitted by the eNB, according to one of the above-described embodiments C-1 to C-3 of the present invention. The UE processor may determine whether the CC is the SCC-only NCT CC or the stand-alone CC using the PSS/SSS, the TRS, and/or the PBCH received on the CC.

The eNB processor of the present invention may control the eNB RF unit to transmit the PSS/SSS, the TRS, and/or the PBCH according to one of the above-described embodiments D-1 to D-3 of the present invention so as to determine whether a frame on the NCT CC is configured according to FDD or according to TDD. The UE RF unit of the present invention may receive the PSS/SSS, the TRS, and/or the PBCH transmitted on a CC by the eNB according to one of the above-described embodiments C-1 to C-3 of the present invention. The UE processor may determine whether the CC is configured according to FDD or according to TDD by using the PSS/SSS, the TRS, and/or the PBCH received on the CC.

Upon transmitting an RRM request message for a CC to the UE, the eNB processor of the present invention may control the eNB RF unit to further transmit information indicating a type of the CC to the UE. The eNB processor may include information indicating the type of the CC in the RRM request message. For example, the eNB processor may control the eNB RF unit to transmit information indicating whether the CC is an LCT CC or an NCT CC. As another example, the eNB processor may control the eNB RF unit to transmit information indicating whether the CC is an NCT CC, an SCC-only NCT CC, or a stand-alone CC. Alternatively, the eNB processor may control the eNB RF unit to transmit information indicating the type of an RS for RRM instead of the information indicating the type of the CC or together with the information indicating the type of the CC. The information indicating the type of the RS for RRM may be information indicating the type of an RS for measurement. For example, the information indicating the type of the RS for RRM may be information indicating the RS for RRM of a corresponding CC is a CRS, a TRS, or a CSI-RS. The eNB processor may control the eNB RF unit to transmit information about a frequency band used for transmission of the TRS in the CC. The eNB processor may control the eNB RF unit to further transmit CSI configuration information of the CC. If the UE RF unit receives the information indicating the type of the CC, the UE processor may perform RRM according to the type of a measurement object CC. For example, if the measurement object CC is an LCT CC, the UE processor which has received RRM request may perform RRM using a CRS. If the UE RF unit receives information indicating the type of the RS for RRM, the UE processor may perform RRM for the measurement object CC using a corresponding RS.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a base station, a UE, or other devices in a wireless communication system.

The invention claimed is:

1. A method for performing radio resource management by a user equipment, the method comprising:
   receiving, by the user equipment, a radio resource management request for a cell; and
   performing, by the user equipment, radio resource management for the cell based on the radio resource management request,
   wherein the radio resource management request includes information indicating a type of a reference signal used for the radio resource management, and
   wherein the radio resource management request further includes information indicating a bandwidth for a tracking reference signal of the cell when the information indicating the type of the reference signal indicates that the reference signal used for the radio resource management is the tracking reference signal.

2. The method according to claim 1,
   wherein the information indicating the type of the reference signal indicates at least whether the reference signal used for the radio resource management is a channel state information reference signal.

3. The method according to claim 2,
   wherein the radio resource management request further includes channel state information reference signal configuration information of the cell.

4. A user equipment for performing radio resource management, the user equipment comprising:
   a radio frequency (RF) unit; and
   a processor configured to control the RF unit to receive a radio resource management request for a cell,
   wherein the processor is further configured to perform radio resource management for the cell based on the radio resource management request received by the RF unit,
   wherein the radio resource management request includes information indicating a type of a reference signal used by the processor for performing the radio resource management, and
   wherein the radio resource management request further includes information indicating a bandwidth for a tracking reference signal of the cell when the information indicating the type of the reference signal indicates that the reference signal used for the radio resource management is the tracking reference signal.

5. The user equipment according to claim 4,
wherein the information indicating the type of the reference signal indicates at least whether the reference signal used for the radio resource management is a channel state information reference signal.

6. The user equipment according to claim 5,
wherein the radio resource management request further includes channel state information reference signal configuration information of the cell.

7. A method for requesting radio resource management by a base station, the method comprising:
transmitting, by the base station, a radio resource management request for a cell,
wherein the radio resource management request includes information indicating a type of a reference signal used for radio resource management for the cell, and
wherein the radio resource management request further includes information indicating a bandwidth for a tracking reference signal of the cell when the information indicating the type of the reference signal indicates that the reference signal used for the radio resource management is the tracking reference signal.

8. The method according to claim 7,
wherein the information indicating the type of the reference signal indicates at least whether the reference signal used for the radio resource management is a channel state information reference signal, and the radio resource management request further includes channel state information reference signal configuration information of the cell.

9. A base station for requesting radio resource management, the base station comprising:
a radio frequency (RF) unit; and
a processor configured to control the RF unit to transmit a radio resource management request for a cell,
wherein the radio resource management request includes information indicating a type of a reference signal used for radio resource management for the cell, and
wherein the radio resource management request further includes information indicating a bandwidth for a tracking reference signal of the cell when the information indicating the type of the reference signal indicates that the reference signal used for the radio resource management is the tracking reference signal.

10. The base station according to claim 9,
wherein the information indicating the type of the reference signal indicates at least whether the reference signal used for the radio resource management is a channel state information reference signal.

11. The base station according to claim 10,
wherein the radio resource management request further includes channel state information reference signal configuration information of the cell.

\* \* \* \* \*